(12) United States Patent
Ta et al.

(10) Patent No.: US 12,476,611 B2
(45) Date of Patent: Nov. 18, 2025

(54) REDUCTION OF ON-DIE PARASITIC CAPACITANCE FOR 5G FILTER DESIGN WITH HIGH ISOLATION

(71) Applicant: SKYWORKS SOLUTIONS, INC., Irvine, CA (US)

(72) Inventors: Hai H. Ta, San Diego, CA (US); Shihan Qin, Fresno, CA (US); Nicholas Quinn Muhlmeyer, Newbury Park, CA (US); Weimin Sun, Santa Rosa Valley, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 333 days.

(21) Appl. No.: 18/125,280

(22) Filed: Mar. 23, 2023

(65) Prior Publication Data
US 2023/0318568 A1    Oct. 5, 2023

Related U.S. Application Data

(60) Provisional application No. 63/326,563, filed on Apr. 1, 2022.

(51) Int. Cl.
*H03H 9/54* (2006.01)
*H04B 1/00* (2006.01)

(52) U.S. Cl.
CPC .......... *H03H 9/542* (2013.01); *H04B 1/0057* (2013.01)

(58) Field of Classification Search
CPC .. H03H 9/542; H03H 9/02125; H03H 9/0542; H03H 9/0571; H04B 1/0057
USPC .......................................... 333/133, 186–188
See application file for complete search history.

(56) References Cited

U.S. PATENT DOCUMENTS

| | | | |
|---|---|---|---|
| 10,432,235 B2 | 10/2019 | Thompson et al. | |
| 10,916,512 B2 | 2/2021 | Quaglietta et al. | |
| 2012/0182087 A1* | 7/2012 | Ye | H03H 9/542 |
| | | | 333/133 |
| 2020/0321938 A1* | 10/2020 | Sawamura | H03H 9/05 |
| 2022/0158620 A1* | 5/2022 | Park | H03H 9/17 |

* cited by examiner

*Primary Examiner* — Jorge L Salazar, Jr.
(74) *Attorney, Agent, or Firm* — Lando & Anastasi, LLP

(57) ABSTRACT

An acoustic wave filter assembly having reduced on-die capacitance and improved isolation for high-frequency applications. The acoustic wave filter assembly includes a filter port, an antenna port, an acoustic wave filter connected between the filter port and the antenna port, one or more ground pins connected between the filter port and the antenna port, and a metallic guard ring extending around the acoustic wave filter assembly. At least one of the one or more ground pins is connected to the metallic guard ring. A diplexer, multiplexer, radio-frequency module and wireless device are also provided.

20 Claims, 18 Drawing Sheets

REDUCTION OF ON-DIE PARASITIC CAPACITANCE FOR 5G FILTER DESIGN WITH HIGH ISOLATION

CROSS-REFERENCE TO RELATED APPLICATIONS

This application claims priority under 35 U.S.C. § 119(e) to U.S. Provisional Patent Application Ser. No. 63/326,563, titled "REDUCTION OF ON-DIE PARASITIC CAPACITANCE FOR 5G FILTER DESIGN WITH HIGH ISOLATION," filed Apr. 1, 2022, the entire content of which is incorporated herein by reference in its entirety for all purposes.

BACKGROUND

Field

Embodiments of the present disclosure relate to acoustic wave filter design for 5G applications, and in particular to bulk acoustic wave filter assemblies.

Description of the Related Technology

Acoustic wave filter assemblies can filter radio-frequency signals. An acoustic wave filter assembly can include one or more acoustic wave filters. The acoustic wave filters can include a plurality of resonators arranged to filter a radio-frequency signal. The resonators can be arranged as a ladder circuit. Example acoustic wave filters include bulk acoustic wave (BAW) filters. Acoustic wave filter assemblies can be implemented in radio-frequency electronic systems.

SUMMARY

According to one embodiment there is provided a filter assembly. The filter assembly comprises a metallic guard ring extending around the filter assembly, an antenna port, a filter port, and an acoustic wave filter connected between the antenna port and the filter port. The acoustic wave filter includes one or more bulk acoustic wave resonators, and one or more ground pins connected between the filter port and the antenna port. At least one of the one or more ground pins are further connected to the metallic guard ring.

In one example, the acoustic wave filter is configured to filter a transmit signal received at the filter port to a cellular frequency pass band and output the filtered transmit signal at the antenna port.

In one example, the acoustic wave filter is configured to filter a receive signal received at the antenna port to a cellular frequency pass band and output the filtered receive signal at the filter port.

In one example, the acoustic wave filter is a band-pass filter.

In one example, the acoustic wave filter has a pass band between approximately 4.4 GHz and 5 GHz.

In one example, the acoustic wave filter has a pass band between approximately 3.3 GHZ and 4.2 GHz.

According to another embodiment there is provided a diplexer. The diplexer comprises a first acoustic wave filter connected between an antenna port and a first filter port, the first acoustic wave filter including one or more bulk acoustic wave resonators, a second acoustic wave filter connected between the antenna port and a second filter port, the second acoustic wave filter including one or more bulk acoustic wave resonators, a metallic guard ring extending around the first and second acoustic wave filters, and one or more ground pins connected between the antenna port and the first and second filter ports. At least one of the one or more ground pins is further connected to the metallic guard ring.

In one example, the diplexer is arranged on a single semiconductor chip.

In one example, the first acoustic wave filter is configured to filter a transmit signal received at the first filter port to a first frequency pass band and output the filtered transmit signal to the antenna port.

In one example, the first acoustic wave filter is configured to filter a receive signal received at the antenna port to a first frequency pass band and output the filtered receive signal to the first filter port.

In one example, the second acoustic wave filter is configured to filter a transmit signal received at the second filter port to a second frequency pass band and output the filtered transmit signal to the antenna port.

In one example, the second acoustic wave filter is configured to filter a receive signal received at the antenna port to a second frequency pass band and output the filtered receive signal to the second filter port.

In one example, the first acoustic wave filter is a band-pass filter having a pass band between 4.4 GHz and 5 GHz.

In one example, the second acoustic wave filter is a band-pass filter having a pass band between 3.3 GHZ and 4.2 GHZ.

According to another embodiment, there is provided a multiplexer. The multiplexer comprises a first filter assembly including a first antenna port, one or more first filter ports, one or more first acoustic wave filters connected between the first antenna port and the one or more first filter ports, and one or more ground pins, a second filter assembly including a second antenna port, one or more second filter ports, one or more second acoustic wave filters connected between the second antenna port and the one or more second filter ports, and one or more ground pins, and a metallic guard ring extending around the first and second filter assemblies. At least one of the one or more ground pins of the first filter assembly is connected to the metallic guard ring, and at least one of the one or more ground pins of the second filter assembly is connected to the metallic guard ring.

In one example, the multiplexer further comprises a conductive strip extending across the surface of the semiconductor chip between the first filter assembly and the second filter assembly, the conductive strip being connected at a first and a second end to the metallic guard ring.

In one example, the conductive strip is further connected to a ground pin located between the first filter and second filter assembly.

In one example, the first and second filter assemblies are diplexers.

In one example, the multiplexer is formed on a single semiconductor chip.

According to another embodiment, there is provided a radio-frequency module. The radio frequency module comprises a packaging substrate configured to receive a plurality of components, a first diplexer including a plurality of acoustic wave filters and one or more ground pins, a second diplexer including a plurality of acoustic wave filters and one or more ground pins, and a metallic guard ring extending around the first and second diplexers. At least one of the one or more ground pins of the first diplexer is connected to the metallic guard ring, and at least one of the one or more ground pins of the second diplexer is connected to the metallic guard ring.

In one example, the radio-frequency module is a front-end module.

According to another embodiment, there is provided a wireless device. The wireless device comprises a transceiver configured to generate a radio-frequency signal, a front-end module in communication with the transceiver, and an antenna in communication with the front-end module. The front-end module includes a packaging substrate configured to receive a plurality of components, a first diplexer having a plurality of acoustic wave filters and one or more ground pins, a second diplexer having a plurality of acoustic wave filters and one or more ground pins, a metallic guard ring extending around the first and second diplexers. At least one of the one or more ground pins of the first diplexer is connected to the metallic guard ring, and at least one of the one or more ground pins of the second diplexer is connected to the metallic guard ring.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
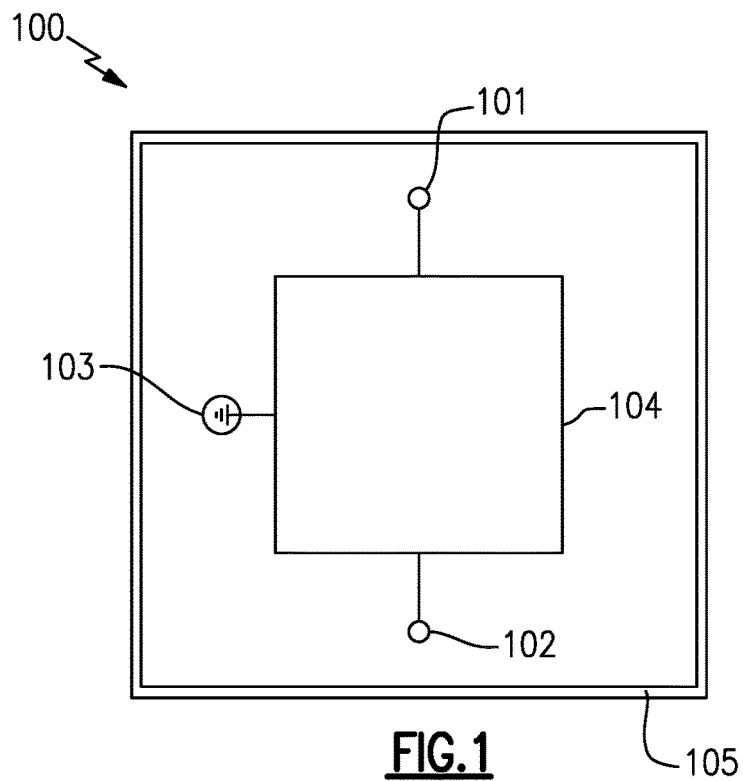
FIG. 1 is a schematic example of a known acoustic wave filter assembly.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phrascology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Bulk acoustic wave (BAW) resonators are a form of acoustic wave resonator that generally includes a layer of piezoelectric material sandwiched between a top and a bottom electrode and suspended over a cavity that allows for the layer of piezoelectric material to vibrate. A signal applied across the top and bottom electrodes causes an acoustic wave to be generated in and travel through the layer of piezoelectric material. A BAW resonator exhibits a frequency response to applied signals with a resonance peak determined by a thickness of the film of piezoelectric material. The primary acoustic wave generated in a BAW resonator is an acoustic wave that travels through the layer of piezoelectric material in a direction perpendicular to layers of conducting material forming the top and bottom electrodes.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

Frequency Range 1 (FR1) communications technology forms part of the development program of 5G NR. In particular, FR1 communications, also known as 'sub-6 GHz' involve communication over high frequencies, such as between 410 MHz and 7125 MHz. The high communication frequency allows for faster data transfer rates than previous-generation communications technologies.

Embodiments of the present disclosure may be configured to handle radio-frequency signals in the range of approximately 410 MHz to approximately 7125 MHz, such as one or more bands of the FR1 communications spectrum such as n77 (about 3.3 GHz to about 4.2 GHZ) or n79 (about 4.4 GHz to about 5 GHZ).

Millimeter-wave (mmWave) technology also forms part of the development program of 5G NR. In particular, mmWave communications, also known as Frequency Range 2 (FR2), involve communication over high frequencies, such as between 24 GHZ and 300 GHz. The high frequency allows communications using mmWave to transfer data even faster than FR1 communications, and to take advantage of a less congested spectrum.

Millimeter wave frequency bands exist in the range of 30 GHZ to 300 GHZ, or more particularly between 24 GHZ and 53 GHZ, such as Band n257 (about 26.5 GHz to about 29.5 GHZ), Band n258 (about 24.25 GHZ to about 27.5 GHZ), Band n259 (about 39.5 GHZ to 43.5 GHZ), Band n260 (about 37 GHz to about 40 GHz), Band n261 (about 27.5 GHZ to about 28.35 GHZ), and/or Band n262 (about 47.2 GHz to about 48.2 GHZ) and/or other equivalent 5G radiofrequency bands in the 5G "Frequency Range 2" range.

The teachings herein are applicable to a wide variety of communication systems, including, but not limited to, communication systems using advanced cellular technologies, such as LTE-Advanced, LTE-Advanced Pro, and/or 5G NR.

Aspects and embodiments described herein are directed to an acoustic wave filter assembly. In particular, embodiments herein reduce the effects of parasitic capacitance that become increasingly significant at high operating frequencies such as those associated with 5G NR. The increased parasitic capacitance is caused by the formation of capacitive coupling between signal inputs and the metallic guard ring surrounding the filter assembly. Embodiments disclosed herein are directed to acoustic wave filter assemblies that address the problem of reducing on-die parasitic capacitance, and therefore improved out-of-band rejection. The reduction in on-die capacitance can be achieved by forming a direct electrical connection between one or more of the ground pins of the acoustic wave filter assembly and the metallic guard ring. Embodiments disclosed herein are further directed to acoustic wave filter assemblies that address the problem of improved isolation. The improved isolation may be achieved via relocation of the one or more signal input pins.

FIG. 1 is a schematic showing the configuration of a known acoustic wave filter assembly, indicated generally at 100. The acoustic wave filter assembly 100 includes a filter port 101. The filter port 101 may be configured to connect to, for example, a transceiver module of a wireless device, and may receive transmit signals from the transceiver module, and output receive signals to the transceiver module. The acoustic wave filter assembly 100 includes an antenna port 102. The antenna port may be configured to connect to an antenna, and may receive signals from the antenna, and output transmit signals to the antenna. The acoustic wave filter assembly 100 includes an acoustic wave filter 104 connected between the filter port 101 and the antenna port 102. The acoustic wave filter 104 may be configured to receive signals having a certain first frequency range and output filtered signals having one or more second frequency ranges. For example, the acoustic wave filter may be a band-pass filter configured to receive signals having a relatively broad range of frequencies and output filtered signals having a frequency range corresponding to the pass band of the acoustic wave filter 104. The acoustic wave filter 104 may comprise one or more acoustic wave resonators, such as bulk acoustic wave (BAW) resonators. The acoustic wave filter assembly 100 includes a ground pin 103 connected between the filter port 101 and the antenna port 102. The ground pin 103 may be formed in or electrically connected to the acoustic wave filter 104. The ground pin 103 may be configured to be electrically connected to ground. The acoustic wave filter assembly 100 may include a plurality of ground pins connected between the filter port 101 and the antenna port 102.

The acoustic wave filter assembly 100 includes a metallic guard ring 105 extending around the acoustic wave filter assembly 100. As shown, the metallic guard ring 105 extends around the periphery of the acoustic wave filter assembly 100, including the filter port 101, the antenna port 102, and the ground pin 103. The metallic guard ring 105 is formed of an electrically conducting material. The electrically conducting material may comprise gold, copper, and/or indium. The purpose of the metallic guard ring 105 is to provide structural support to the acoustic wave filter assembly 100, and to protect the acoustic wave filter assembly 100 from the ingress of moisture. Additionally, the metallic guard ring 105 can provide electromagnetic shielding to components within the acoustic wave filter assembly 100. As discussed above, the acoustic wave filter 104 may include one or more acoustic wave resonators. Acoustic wave resonators are fragile components, that should be protected both from physical stresses and from environmental contamination.

In operation, the acoustic wave filter assembly 100 may receive a transmit signal at the filter port 101. The transmit signal may have a certain first frequency range. The transmit signal is passed to the acoustic wave filter 104, which filters the transmit signal to a second frequency range and then outputs the filtered transmit signal to the antenna port 102.

It has been found that, at high operating frequencies, such as those associated with 5G NR FR1 communications, the proximity of the metallic guard ring 105 to the filter port 101 and antenna port 102 can result in unwanted capacitive coupling between the metallic guard ring 105 and each of the filter port 101 and antenna port 102. The resulting parasitic capacitance can reduce the performance of the acoustic wave filter 104. For instance, in examples where the acoustic wave filter 104 is a band-pass filter, the parasitic capacitance can result in the out-of-band rejection of the acoustic wave filter 104 being bypassed. This can be seen looking at the frequency response curves illustrated in FIGS. 6-8.

In known acoustic wave filter assemblies, the increased parasitic capacitance may be overcome by adding additional stages to the acoustic wave filter 104, therefore increasing the rejection of out-of-band frequencies. However, adding additional stages to the acoustic wave filter 104 increases the size of the acoustic wave filter assembly.

Figure 2:
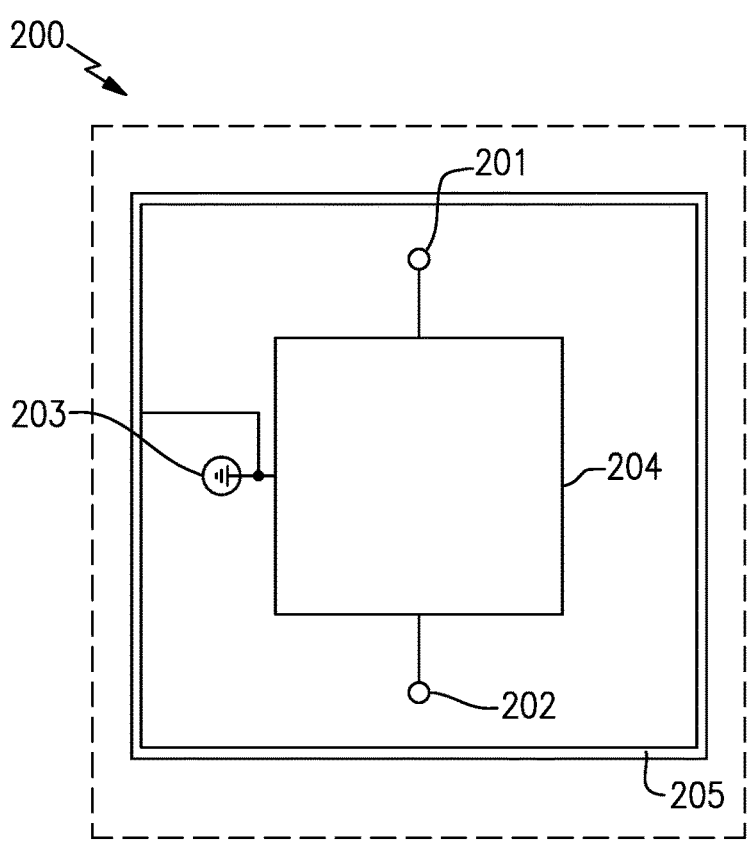
FIG. 2 is a schematic of an acoustic wave filter assembly according to aspects of the present disclosure.

FIG. 2 illustrates an acoustic wave filter assembly according to the present disclosure, indicated generally at 200. The acoustic wave filter assembly includes a filter port 201. The filter port 201 may be configured to connect to, for example, a transceiver module of a wireless device, and may receive transmit signals from the transceiver module, and output receive signals to the transceiver module. The acoustic wave filter assembly 200 includes an antenna port 202. The antenna port may be configured to connect to an antenna, and may receive signals from the antenna, and output transmit signals to the antenna. The acoustic wave filter assembly 200 includes an acoustic wave filter 204 connected between the filter port 201 and the antenna port 202. The acoustic wave filter 204 may be configured to receive signals having a certain first frequency range and output filtered signals having one or more second frequency ranges. For example, the acoustic wave filter may be a band-pass filter configured to receive signals having a relatively broad range of frequencies and output filtered signals having a frequency range corresponding to the pass band of the acoustic wave filter 204. The pass band of the acoustic wave filter 204 may be a cellular frequency pass band, in particular, the pass band may be between approximately 4.4 GHZ and approximately 5 GHZ, or between approximately 3.3 GHZ and approximately 4.2 GHZ. The acoustic wave filter 204 includes one or more bulk acoustic wave (BAW) resonators.

It has been found that, when operating a high frequencies such as those associated with 5G NR FR1 technology, BAW resonators are preferable to other types of resonator such as surface acoustic wave (SAW) resonators due to their high quality factor (Q-factor).

The acoustic wave filter assembly 200 includes a ground pin 203 connected between the filter port 201 and the antenna port 202. In some embodiments, the acoustic wave filter assembly 201 includes a plurality of ground pins connected between the filter port 201 and the antenna port 202. The one or more ground pins 203 may be formed in or electrically connected to the acoustic wave filter 204. The one or more ground pins 203 is configured to be electrically connected to ground. The acoustic wave filter assembly 200 includes a metallic guard ring 205 extending around the acoustic wave filter assembly 200. In the embodiment shown, the ground pin 203 is further connected to the metallic guard ring 205. The connection between the ground pin 203 and the metallic guard ring 205 is a direct electrical connection, such that electrical charge may flow between the metallic guard ring 205 and the ground pin 203 and vice versa. As such, when the ground pin 203 is connected to ground, the metallic guard ring 205 is grounded via the ground pin 203.

In operation, the acoustic wave filter assembly 200 may receive a transmit signal at the filter port 201. The transmit signal may have a certain first frequency range. The transmit signal is transmitted to the acoustic wave filter 204, which filters the transmit signal to a second frequency range and then outputs the filtered transmit signal to the antenna port 202. Alternatively, the acoustic wave filter assembly 200 may receive a receive signal at the antenna port 202. The receive signal may have a first frequency range. The receive signal is transmitted to the acoustic wave filter 204, which filters the receive signal to a second frequency range and then outputs the filtered receive signal to the filter port 201.

At high operating frequencies, such as those associated with 5G NR FR1 communications, it has been found that the parasitic capacitance resulting from the coupling between the metallic guard ring 205 and each of the filter port 201 and antenna port 202 is reduced by virtue of the electrical connection between the ground pin 203 and the metallic guard ring 205. The reduction in parasitic capacitance can significantly improve the filter performance at these high operating frequencies. For example, where the acoustic wave filter 204 is a band pass filter having a pass band between approximately 3.3 GHz to 4.2 GHz, the connection between the ground pin 203 and the metallic guard ring 205 can improve the out-of-band rejection, such as below 3.3 GHZ and above 4.2 GHz. Similarly, where the acoustic wave filter 204 is a band pass filter having a pass band between approximately 4.4 GHz to 5 GHZ, the connection between the ground pin 203 and the metallic guard ring 205 can improve the out-of-band rejection below 4.4 GHZ and above 5 GHz.

Figure 3:
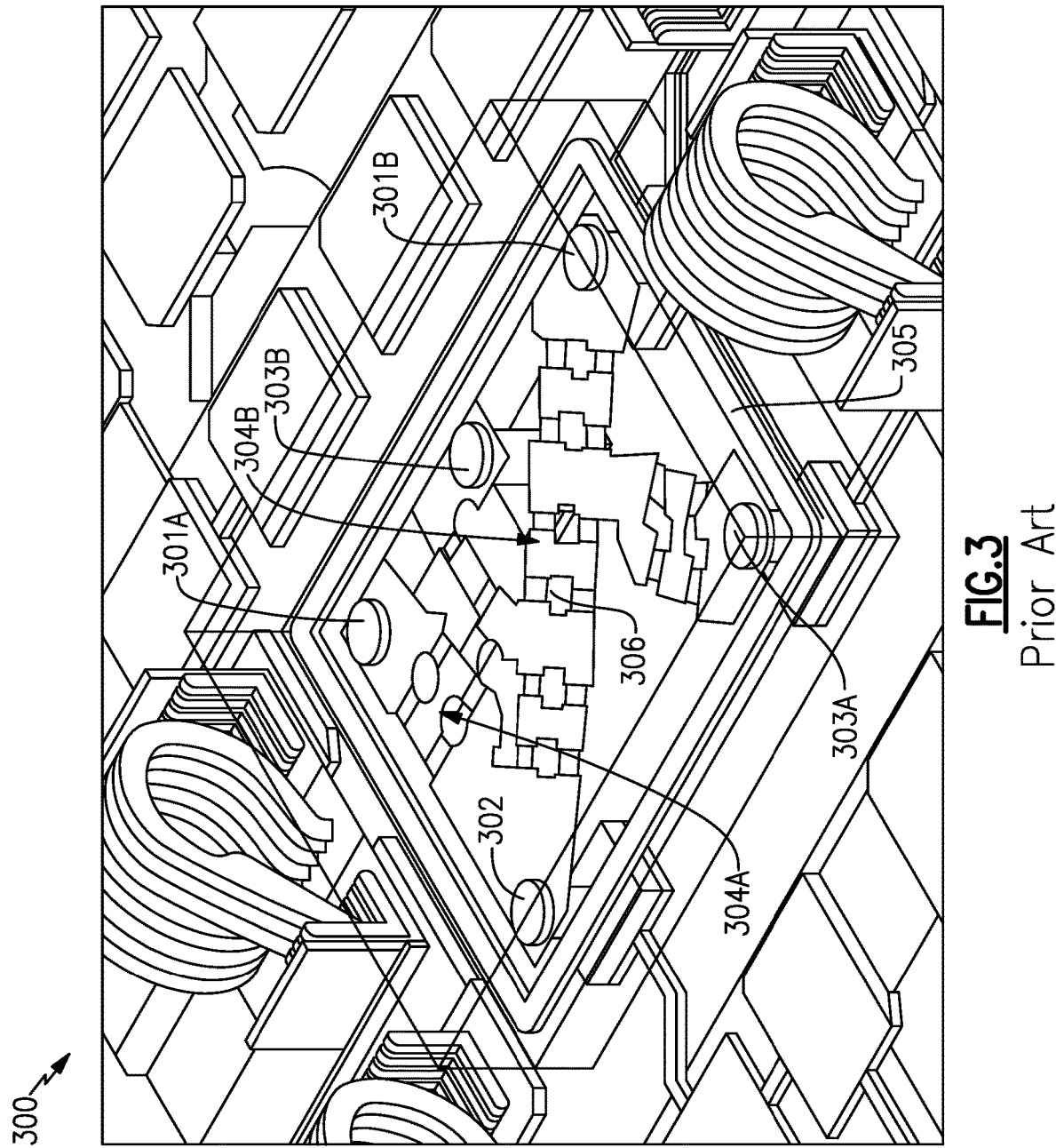
FIG. 3 is an example of a known acoustic wave filter assembly.
Figure 4:
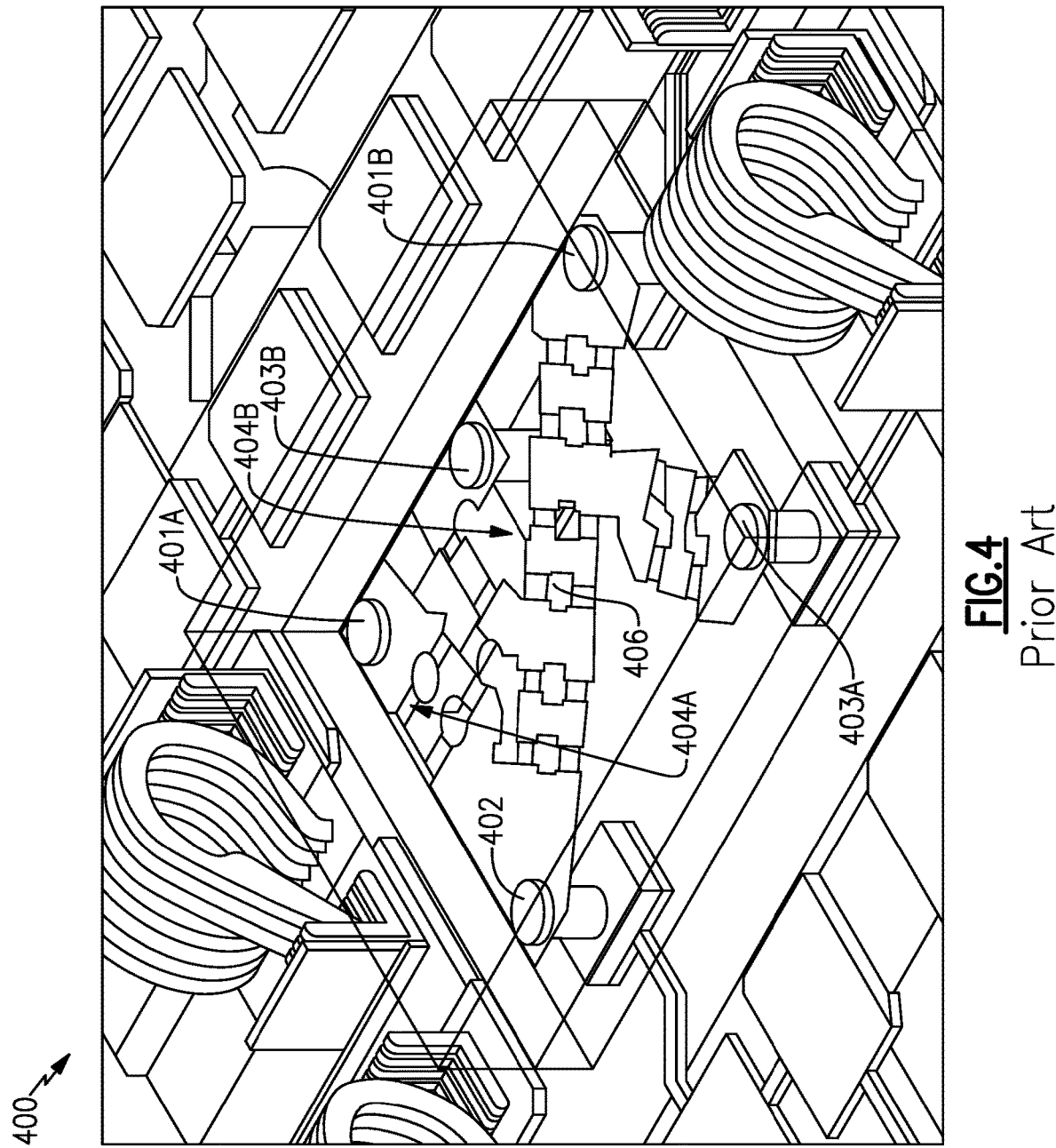
FIG. 4 is an example of an acoustic wave filter assembly.
Figure 5:
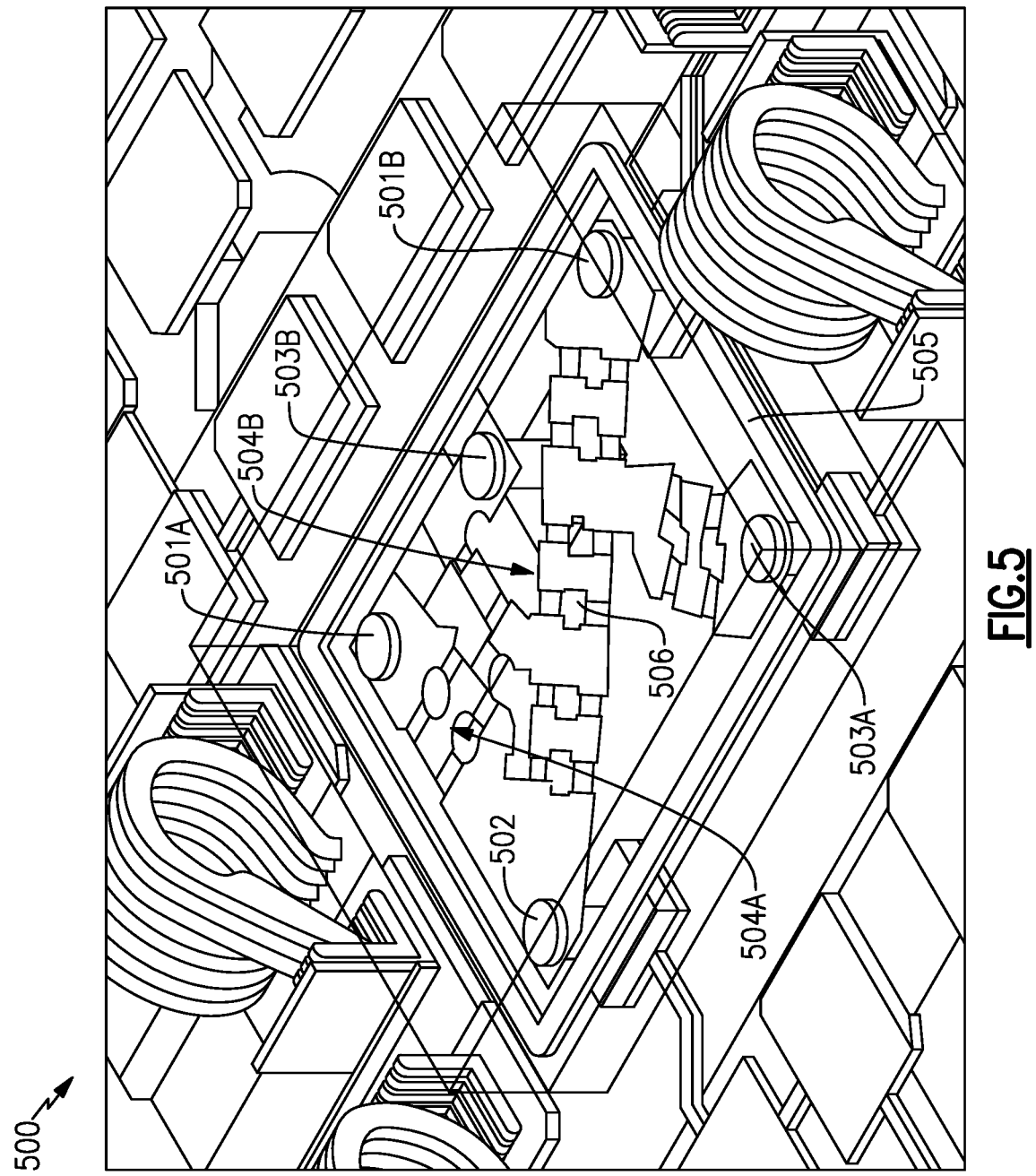
FIG. 5 is an example of an acoustic wave filter assembly according to aspects of the present disclosure.

FIG. 3-5 illustrate filter assemblies. In particular, FIG. 3 illustrates a known acoustic wave filter assembly, indicated generally at 300. FIG. 4 illustrates an exemplary acoustic wave filter assembly, indicated generally at 400. FIG. 5 illustrates an acoustic wave filter assembly according to the present disclosure, indicated generally at 500. The features of these three arrangements will be set out below, and then the relative performance of each arrangement will be discussed with reference to the signal response curves of FIGS. 6-8.

The acoustic wave filter assembly 300 of FIG. 3 may be disposed on a substrate, for example, a silicon substrate that may include a dielectric surface layer of, for example, silicon dioxide. The acoustic wave filter assembly 300 includes a first filter port 301A. The first filter port 301A may be configured to connect to, for example, a transceiver module of a wireless device, and may receive transmit signals from the transceiver module, and output receive signals to the transceiver module. The acoustic wave filter assembly 300 includes a second filter port 301B. The second filter port 301B may also be configured to connect to, for example, a transceiver module of a wireless device, and may also receive transmit signals from the transceiver module, and output receive signals to the transceiver module. The acoustic wave filter assembly 300 includes an antenna port 302, configured to connect to an antenna, and transmit and receive signals via the antenna. The acoustic wave filter assembly 300 includes a first acoustic wave filter 304A connected between the first filter port 301A and the antenna port 302, and a second acoustic wave filter 304B connected between the second filter port 301B and the antenna port. Each of the acoustic wave filters 304A, 304B, may be configured to receive signals having a certain first frequency range, and output filtered signals. The acoustic wave filter assembly includes first and second ground pins 303A, 303B connected between the antenna port 302 and the first and second filter ports 301A, 301B. The acoustic wave filter assembly 300 includes a metallic guard ring 305 extending around the acoustic wave filter assembly 300. The metallic guard ring 305 may be configured in accordance with the metallic guard ring 105 described above in connection with acoustic wave filter assembly 100 of FIG. 1.

The configuration of acoustic wave filter assembly 400 shown in FIG. 4 corresponds to the acoustic wave filter assembly 300 of FIG. 3, except the acoustic wave filter assembly 400 does not include a metallic guard ring. The acoustic wave filter assembly 400 is a theoretical embodiment, which will be used in FIGS. 6-8 to explain the relative performance of known acoustic wave filter assemblies vs. acoustic wave filter assemblies of the present disclosure.

FIG. 5 shows an acoustic wave filter assembly 500 in accordance with the present disclosure. The acoustic wave filter assembly 500 may be disposed on a substrate, for example, a silicon substrate that may include a dielectric surface layer of, for example, silicon dioxide. The acoustic wave filter assembly 500 includes a first filter port 501A. The first filter port 501A may be configured to connect to, for example, a transceiver module of a wireless device, and may receive transmit signals from the transceiver module, and output receive signals to the transceiver module. The acoustic wave filter assembly 500 includes a second filter port 501B. The second filter port 501B may also be configured to connect to, for example, a transceiver module of a wireless device, and may also receive transmit signals from the transceiver module, and output receive signals to the transceiver module. The acoustic wave filter assembly 500 includes an antenna port 502, configured to connect to an antenna, and transmit and receive signals via the antenna. The acoustic wave filter assembly 500 includes a first acoustic wave filter 504A connected between the first filter port 501A and the antenna port 502, and a second acoustic wave filter 504B connected between the second filter port 501B and the antenna port. Each of the acoustic wave filters 504A, 504B, may be configured to receive signals having a certain first frequency range, and output filtered signals.

In some examples, each of the acoustic wave filters 504A, 504B are band-pass filters. The pass band of the first acoustic wave filter 504A may be different than the pass band of the second acoustic wave filter 504B. As such, the acoustic wave filter assembly 500 may be configured as a diplexer, configured to filter transmit and receive signals at two distinct frequency bands. For example, the first acoustic wave filter 504A may be a pass band filter configured to filter a received signal to a cellular frequency pass band between approximately 3.3 GHZ and 4.2 GHZ, and the second acoustic wave filter 504B may be a pass band filter configured to filter a received signal to a cellular frequency pass band between approximately 4.4 GHZ and 5 GHZ. In alternative embodiments, each of the acoustic wave filters 504A, 504B may be a pass band filter, each having the same frequency pass band. Each of the acoustic wave filters 504A, 504B comprise one or more BAW resonators. The acoustic wave filter assembly includes first and second ground pins 503A. 503B connected between the antenna port 502 and the first and second filter ports 501A, 501B. The acoustic wave filter assembly 500 includes a metallic guard ring 505 extending around the acoustic wave filter assembly 500. The metallic guard ring 505 may be configured in accordance with the metallic guard ring 105 described above in connection with acoustic wave filter assembly 100 of FIG. 1. As can be seen, the ground pin 503B is further electrically connected to the metallic guard ring 505. The connection between the ground pin 503B and the metallic guard ring 505 is a direct electrical connection, such that electrical charge may flow between the metallic guard ring and the ground pin and vice versa. As such, when the ground pin 503B is connected to ground, the metallic guard ring 505 is grounded via the ground pin 503B. In alternative embodiments, either one or both ground pins 503A, 503B may be further electrically connected to the metallic guard ring 505.

Figure 6:
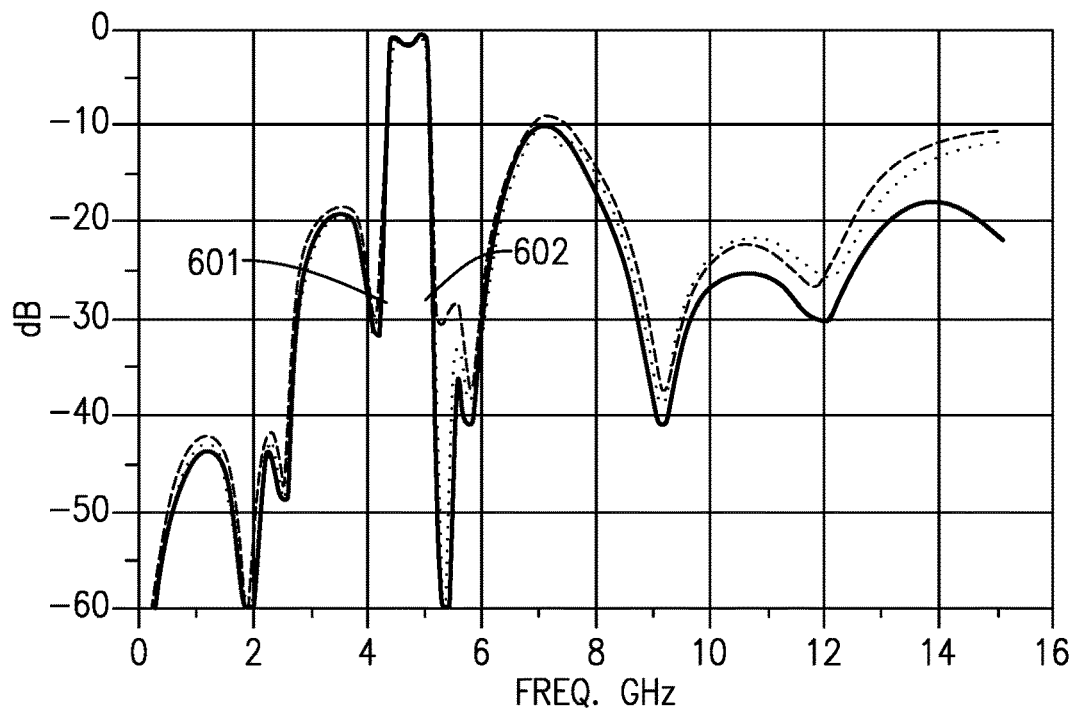
FIG. 6 is a frequency response graph of an acoustic wave filter assembly according to aspects of the present disclosure.
Figure 7:
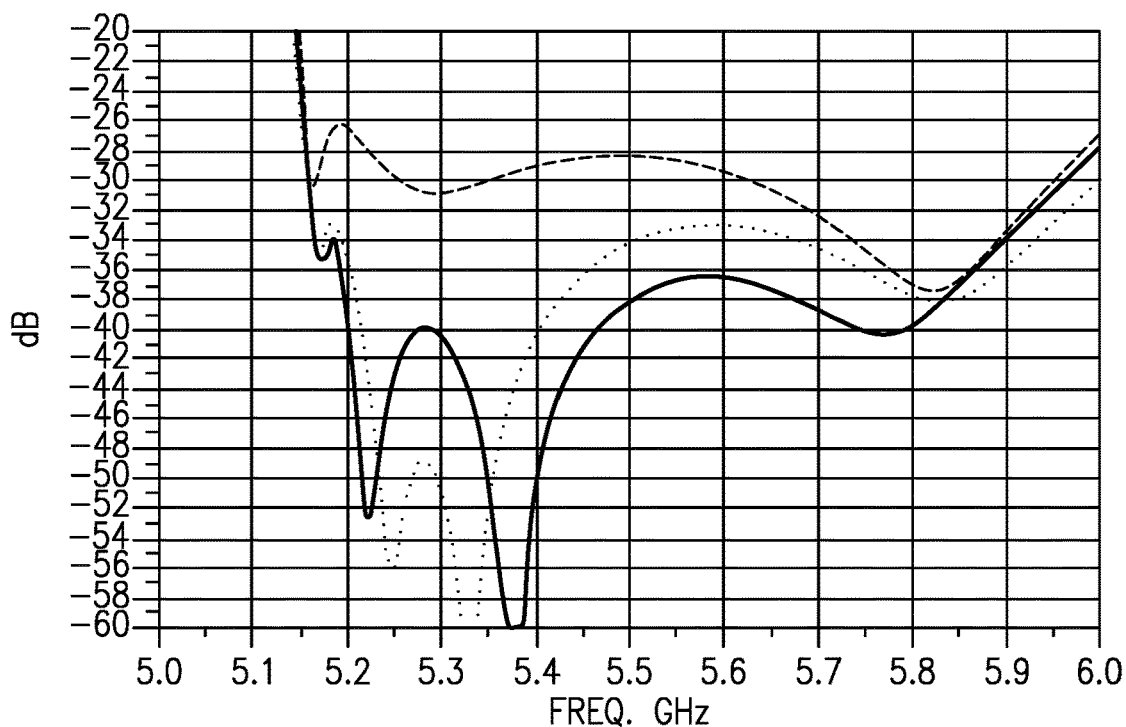
FIG. 7 is another frequency response graph of an acoustic wave filter assembly according to aspects of the present disclosure.
Figure 8:
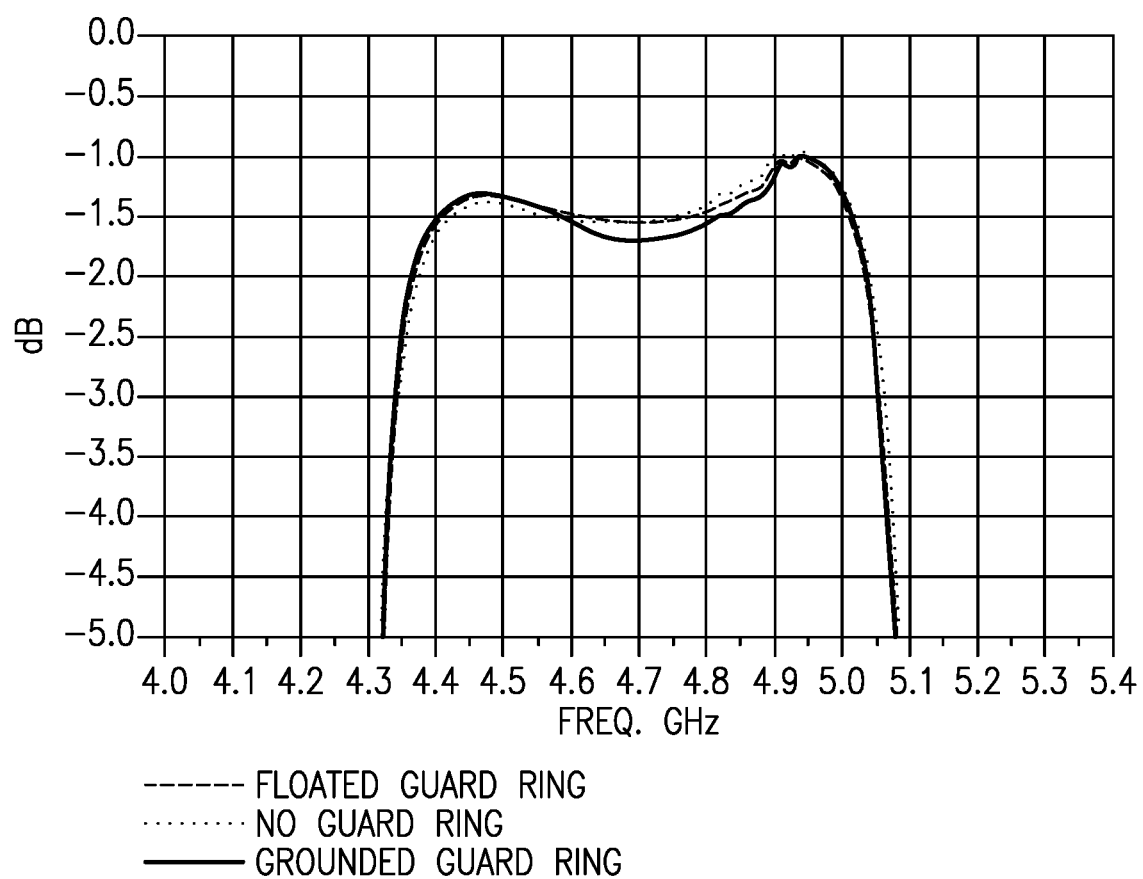
FIG. 8 is another frequency response graph of an acoustic wave filter assembly according to aspects of the present disclosure.

FIGS. 6-8 illustrate frequency response curves for one of the acoustic wave filters shown in each of the acoustic wave filter assembly arrangements shown in FIGS. 3-5. In the exemplary embodiments shown, the acoustic wave filter is a band pass filter having a cellular frequency pass band between approximately 4.4 GHZ and 5 GHZ. The frequency response is measured for the second acoustic wave filters 304B, 404B, 504B, connected between the antenna ports 302, 402, 502 and the second filter ports 301B, 401B, 501B. However, it should be appreciated that the same results are achieved for the first acoustic wave filters 304A, 404A, 504A. In each of FIGS. 6-8 the dashed line represents the signal response curve of acoustic wave filter 304B, comprised in known acoustic wave filter assembly 300 having a floated metallic guard ring that is not electrically connected to either ground pin 303A, 303B, and therefore not grounded. The dotted line represents the signal response curve of acoustic wave filter 404B, shown in theoretical acoustic wave filter 400 of FIG. 4 without a metallic guard ring. The solid line represents the signal response curve of acoustic wave filter 504B, shown in acoustic wave filter assembly 500 of FIG. 5 in accordance with the present disclosure wherein the metallic guard ring 505 is electrically connected to ground pin 503B, and therefore grounded.

FIG. 6 shows the frequency response curves of the acoustic wave filters 304B, 404B, 504B across a broad range of frequencies between approximately 0 Hz and 15 GHZ. The cellular frequency pass band of the acoustic wave filters 304B, 404B, 504B can be seen extending between lower bound 601 (approximately 4.4 GHZ) and upper bound 602 (approximately 5 GHZ).

FIG. 7 shows the out-of-band frequency response of the acoustic wave filters 304B, 404B, 504B between 5 GHZ and 6 GHz. It should be appreciated that, in the case of an acoustic wave filter with a pass band between approximately 4.4 GHZ and 5 GHZ, the out-of-band rejection above 5 GHz is of particular importance. This is due to the presence of the 5 GHZ Wi-Fi (Registered Trade Mark) frequency band. As can be seen from FIG. 7, the out-of-band rejection of acoustic wave filter 504B above 5 GHz is significantly improved compared to acoustic wave filter 304B, thereby demonstrating the improved out-of-band rejection achieved via the electrical connection between ground pin 503B and the metallic guard ring 505. It can also be seen that the out-of-band rejection of acoustic wave filter 404B above 5 GHz is significantly greater than that of acoustic wave filter 304B. This supports the poor out-of-band rejection being caused by the presence of the floated metallic guard ring 305.

FIG. 8 shows the within-band frequency response of the acoustic wave filters 304B, 404B, 504B. As can be seen, the frequency response of the acoustic wave filters 304B, 404B, 504B are substantially the same across the pass band between approximately 4.4 GHZ and 5 GHZ.

Figure 9:
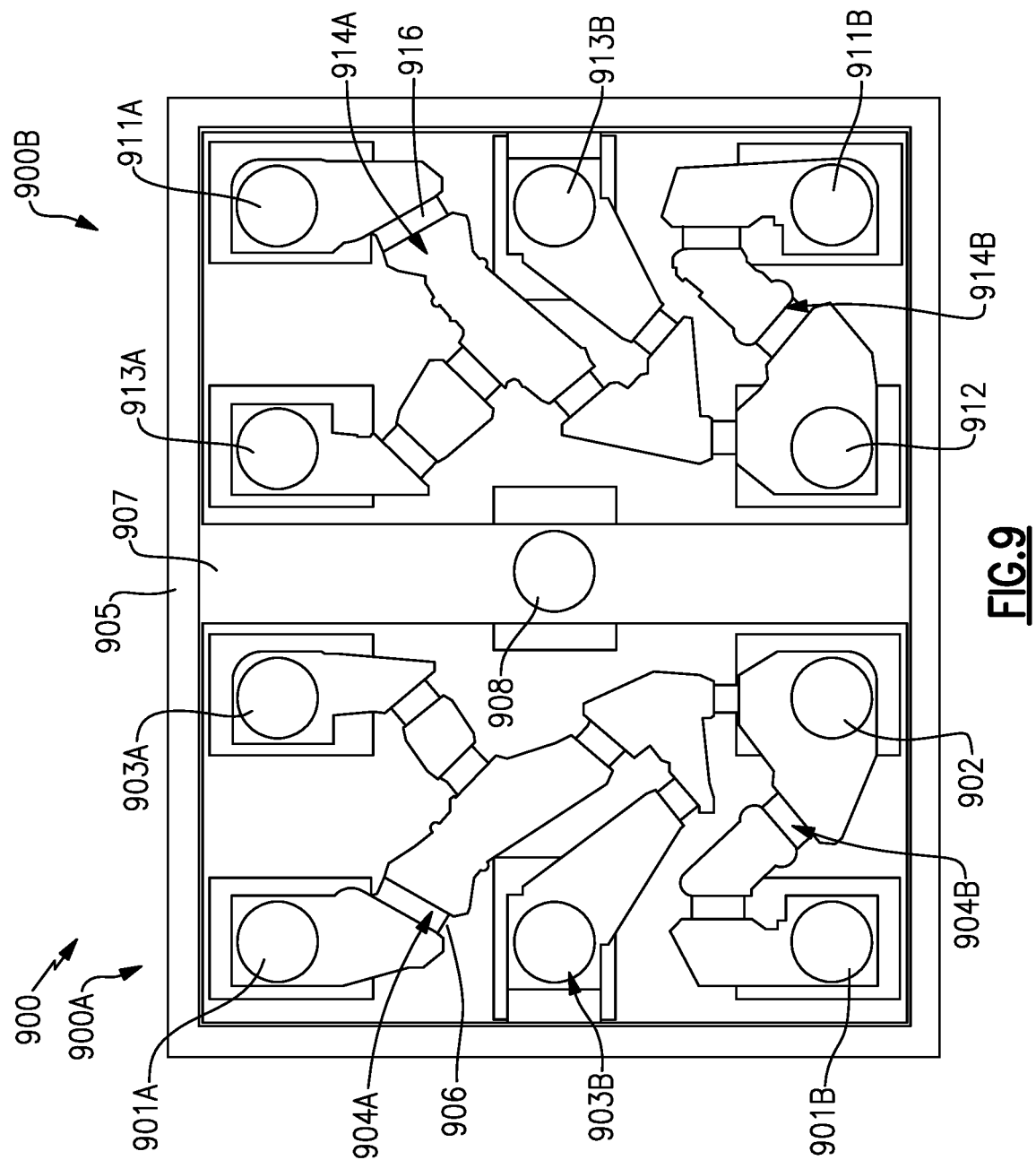
FIG. 9 is an example of an acoustic wave filter assembly according to aspects of the present disclosure.

FIG. 9 illustrates a multiplexer in accordance with the present disclosure, indicated generally at 900. In the illustrated embodiment, multiplexer 900 is formed on a single semiconductor die. The multiplexer 900 includes a first acoustic wave filter assembly 900A. The first acoustic wave filter assembly 900A includes a first filter port 901A. First filter port 901A may be configured to connect to a transceiver module of a wireless device, and may receive transmit signals from the transceiver module, and output receive signals to the transceiver module. The first acoustic wave filter assembly 900A includes a second filter port 901B. Second filter port 901B may also be configured to connect to a transceiver module of a wireless device, and may also receive transmit signals from the transceiver module, and output receive signals to the transceiver module. The first acoustic wave filter assembly 900A includes a first antenna port 902. The first antenna port may be configured to connect to an antenna, and may receive signals from the antenna, and output transmit signals to the antenna. The first acoustic wave filter assembly 900A includes first and second acoustic wave filters 904A, 904B connected between the first antenna port 902 and the first and second filter ports 901A, 901B respectively. In the illustrated embodiment, first acoustic wave filter 904A is a band-pass filter having a cellular frequency pass band between approximately 4.4 GHz and 5 GHZ. Second acoustic wave filter 904B is a band-pass filter having a cellular frequency pass band between approximately 3.3 GHZ and 4.2 GHZ. Accordingly, the first acoustic wave filter assembly 900A of multiplexer 900 is a diplexer, having a first filter channel and second filter channel. The first acoustic wave filter assembly 900A includes first and second ground pins 903A, 903B connected between the first antenna port 902 and the first and second filter ports 901A, 901B. Multiplexer 900 includes a second acoustic wave filter assembly 900B. In the illustrated embodiment, the configuration of the second acoustic wave filter assembly 900B corresponds to the first acoustic wave filter assembly 900A. The second acoustic wave filter assembly 900B includes a third filter port 911A, fourth filter port 911B, and second antenna port 912, with third and fourth acoustic wave filters 914A, 914B connected between the second antenna port 912 and the third and fourth filter ports 911A, 911B respectively. Third acoustic wave filter 914A is a band-pass filter having a cellular frequency pass band between approximately 4.4 GHZ and 5 GHz. Second acoustic wave filter 914B is a band-pass filter having a cellular frequency pass band between approximately 3.3 GHZ and 4.2 GHz. Second acoustic wave filter assembly 900B includes third and fourth ground pins 913A, 913B connected between the second antenna port 912 and the third and fourth filter ports 911A, 911B. Accordingly, in the illustrated embodiment the multiplexer 900 comprises two diplexers. Thus, the multiplexer is able to receive signals at the first and second antenna ports, and filter the received signals to both the first and second filter channels (corresponding to the first and second pass bands of the first/third and second/fourth acoustic wave filters) simultaneously. It will be appreciated that in alternative embodiments, the second acoustic wave filter assembly 900B need not correspond to the first acoustic wave filter assembly 900A. Multiplexer 900 includes a metallic guard ring 905 extending around the multiplexer 900. In the illustrated embodiment, second ground pin 903B of the first acoustic wave filter assembly 900A, and fourth ground pin 913B of the second acoustic wave filter assembly 900B are further connected to the metallic guard ring 905. The connection between the ground pins 903B, 913B and the metallic guard ring 905 is a direct electrical connection, such that electrical charge may flow between the metallic guard ring 905 and the ground pins 903B, 913B and vice versa. As such, when the ground pins 903B, 913B are connected to ground, the metallic guard ring 905 is grounded via the ground pins 903B, 913B. The multiplexer 900 includes a ground pin 908. The ground pin 908 is arranged between the first acoustic wave filter assembly 900A and the second acoustic wave filter assembly 900B. The ground pin 908 is configured to be electrically connected to ground. The ground pin 908 is further connected to the metallic guard ring 905 via a conductive strip 907. The conductive strip 907 may be connected at either end to opposing sides of the metallic guard ring 905, thereby being interposed between the first and second acoustic wave filter assemblies 900A, 900B. In alternative embodiments, the conductive strip 907 may only be connected at one end to the metallic guard strip 905, and may not extend from one side of the metallic guard strip 905 to the other.

Accordingly, first and second acoustic filter assemblies 900A, 900B of multiplexer 900 each achieve the improved out-of-band rejection provided by connecting the metallic guard ring to at least one of the ground pins of the acoustic wave filter assemblies 900A, 900B.

It has been found that when providing the multiplexer 900 on a single semiconductor die, the isolation between the first antenna port 902 and second antenna port 912 can be improved depending on the layout of the antenna ports 902, 912 relative to each other. The isolation between the first and second antenna ports 902, 912 represents the amount of radio-frequency signal that travels between the first and second antenna ports 902, 912. Increasing the isolation results in improved performance of the multiplexer 900 due to the reduction in unwanted cross-talk between the antenna ports 902, 912.

Figure 10:
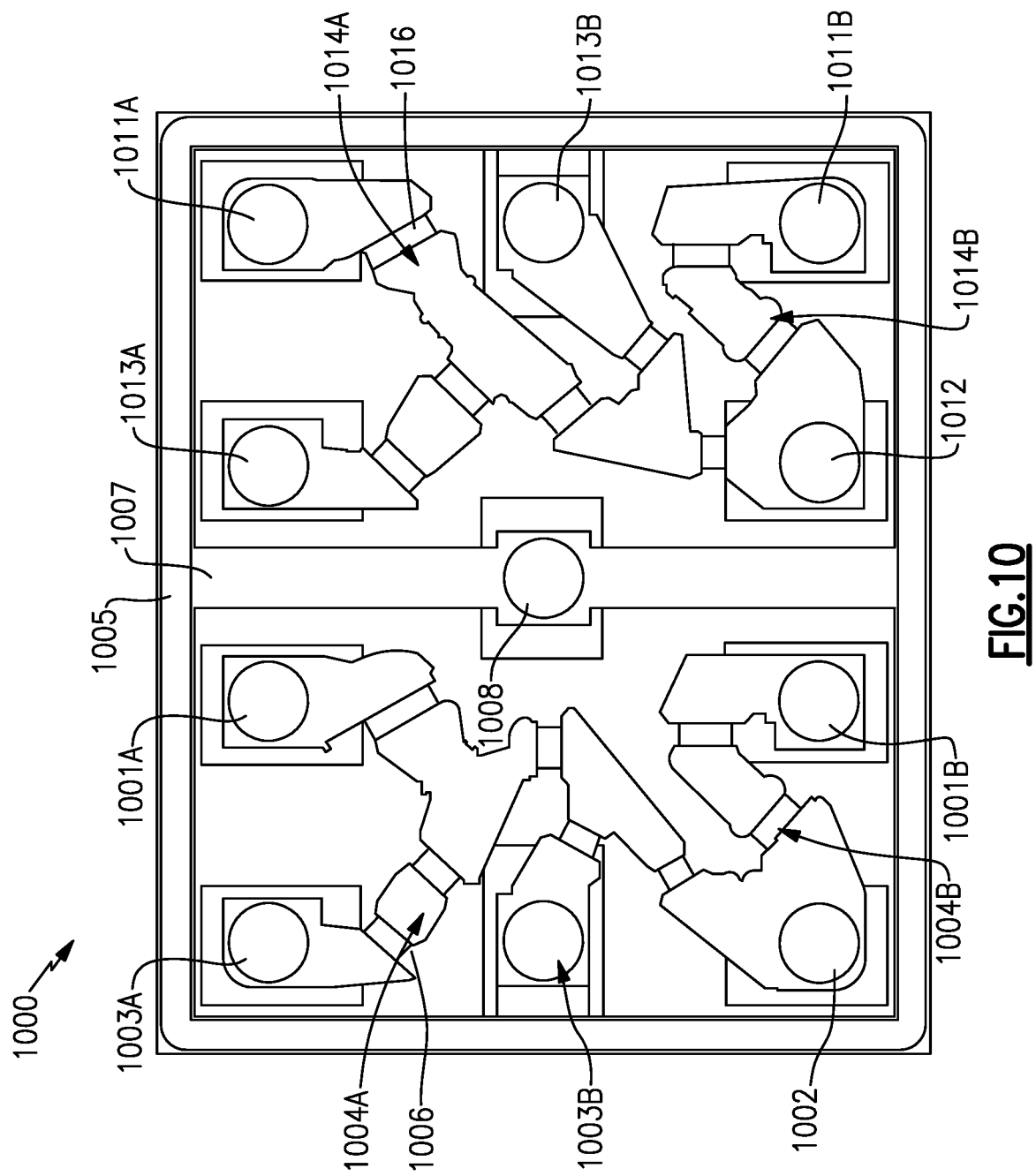
FIG. 10 is another example of an acoustic wave filter assembly according to aspects of the present disclosure.

FIG. 10 illustrates a multiplexer 1000 in accordance with the present disclosure. The multiplexer 1000 is substantially the same as multiplexer 900, but the layout of the first and second filter ports 1001A, 1001B, first ground port 1003A, and first antenna port 1002 have been modified. In particular, the relative positions of the first antenna port 1002 and second filter port 1001B have been reversed. Similarly, the relative positions of the first filter port 1001A and first ground pin 1003A have been reversed. It can therefore be seen that the second filter port 1001B is located in between the first and second antenna ports 1002, 1012, which have an increased spatial separation relative to multiplexer 900. It has been found that providing a multiplexer 1000 wherein the first and second antenna ports 1002, 1012 are separated by at least one of the filter ports 1001A, 1001B, 1011A, 1011B or at least one of the ground pins 1003A, 1003B, 1013A, 1013B, results in improved isolation between the first and second antenna ports 1002, 1012, as will be discussed in connection with FIGS. 11-12.

Figure 11:
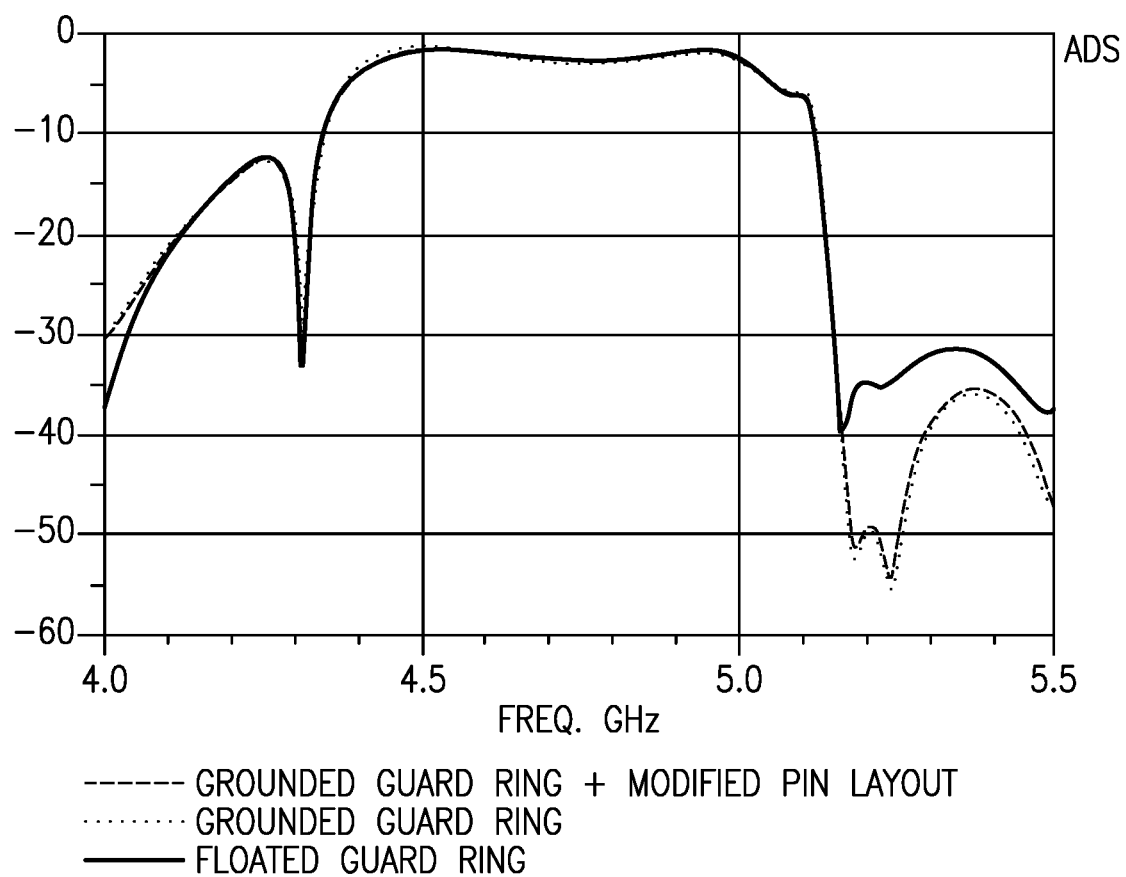
FIG. 11 is another frequency response graph of an acoustic wave filter assembly according to aspects of the present disclosure.
Figure 12:
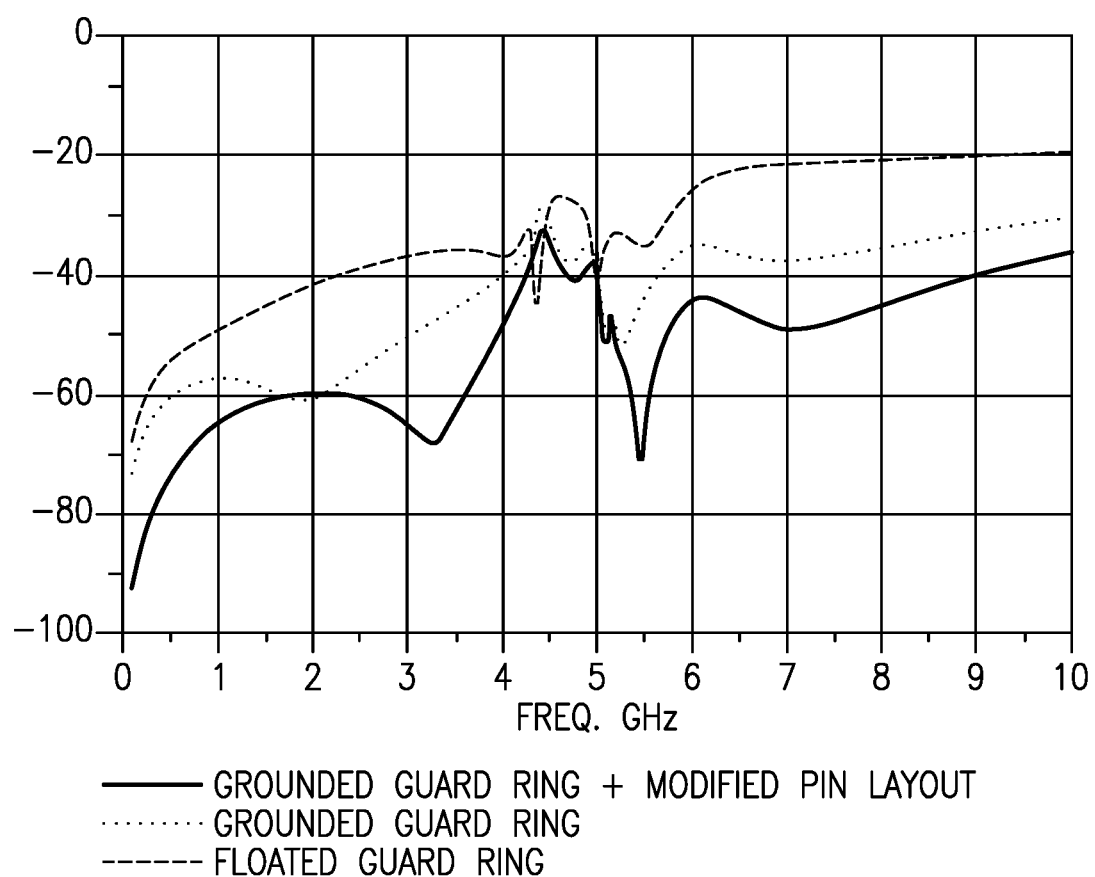
FIG. 12 is a frequency isolation graph of an acoustic wave filter assembly according to aspects of the present disclosure.

FIGS. 11 and 12 illustrate the frequency response curve, and frequency-isolation curve of the multiplexers 900, 1000 of FIGS. 9 and 10. In the exemplary embodiments shown, the acoustic wave filter is a band pass filter having a cellular frequency pass band between approximately 4.4 GHz and 5 GHz shown in either of the first or second acoustic wave filter assemblies 900A, 1000A. 900B, 1000B. The frequency-isolation is measured between the first and second antenna ports 902, 1002, 912, 1012. Also shown in both FIGS. 11 and 12 is the frequency response curve and frequency-isolation curve of a multiplexer having a floated metallic guard ring, i.e., not electrically connected to the multiplexer. In both of FIGS. 11 and 12, the dashed line represents the multiplexer having a floated guard ring. The dotted line represents the multiplexer 900 having a grounded metallic guard ring 905, and pin/port layout according to FIG. 9. The solid line represents the multiplexer 1000 having a grounded metallic guard ring 1005 and modified pin/port layout according to FIG. 10.

FIG. 11 shows the frequency response curves of multiplexers 900, 1000, and a multiplexer with a floated guard ring. As can be seen, the frequency response curves are substantially the same in the out-of-band region below 4.4 GHZ, and in the within-band region between 4.4 GHZ and 5 GHz. In the out-of-band region above 5 GHZ, the out-of-band rejection of the multiplexer having a floated guard ring is lower than that of the multiplexers 900, 1000 having a grounded metallic guard ring 905, 1005. On the other hand, the out-of-band rejection of the multiplexers 900, 1000 in the out-of-band region above 5 GHz is substantially the same.

FIG. 12 shows the frequency-isolation curves of the multiplexers 900, 1000, and a multiplexer with a floated guard ring. As can be seen, the isolation of the multiplexer 900 with a grounded metallic guard ring 905 is higher than that of the multiplexer with a floated guard ring over substantially the entire frequency range between 0 Hz and 10 GHZ. In addition, the isolation of the multiplexer 1000 with the grounded metallic guard ring 1005 and modified pin/port layout is higher than the isolation of the multiplexer 900, and significantly higher than the isolation of the multiplexer with a floated guard ring.

Figure 13:
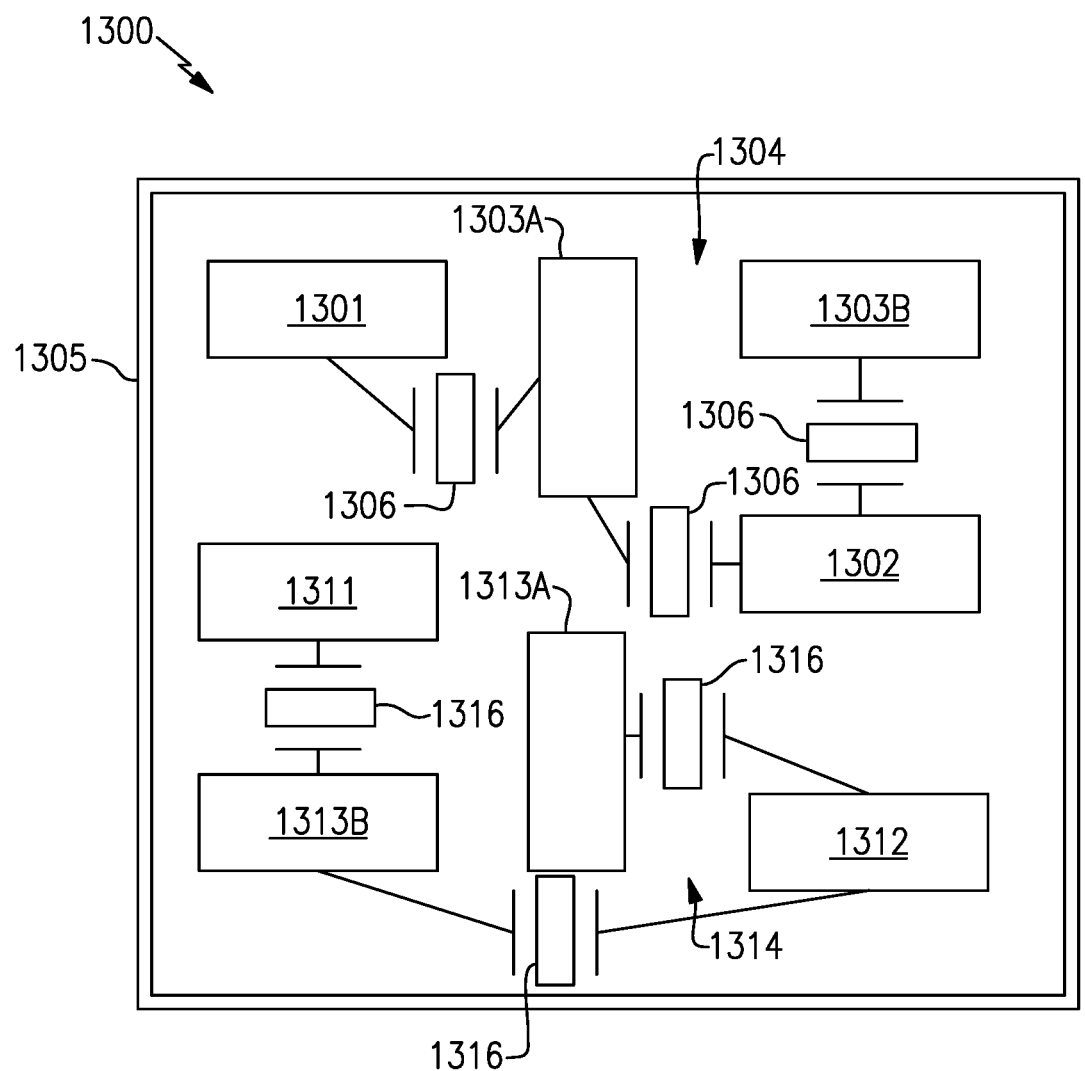
FIG. 13 is another example of a known acoustic wave filter assembly.

FIG. 13 is a schematic showing the configuration of a known acoustic wave filter assembly, indicated generally at 1300. The acoustic wave filter assembly 1300 includes a first filter port 1301. The first filter port 1301 may be configured to connect to, for example, a transceiver module of a wireless device, and may receive transmit signals from the transceiver module, and output receive signals to the transceiver module. The acoustic wave filter assembly includes a first antenna port 1302, configured to connect to an antenna, and transmit and receive signals via the antenna. The acoustic wave filter assembly 1300 includes a first acoustic wave filter 1304 connected between the first filter port 1301 and the first antenna port 1302. In the illustrated embodiment, the first acoustic wave filter 1304 is a band-pass filter configured to receive signals and output filtered signals to a cellular frequency pass band between approximately 3.3 GHZ and 4.2 GHz. The first acoustic wave filter 1304 comprises a plurality of BAW resonators 1306 connected in series and parallel between the first filter port 1301 and the first antenna port 1302. The acoustic wave filter assembly 1300 includes first and second ground pins 1303A, 1303B connected between the first antenna port 1302 and the first filter port 1301. The first and second ground pins 1303A, 1303B may be electrically connected to, or formed in, the first acoustic wave filter 1304. The first and second ground pins 1303A, 1303B, are configured to be connected to ground. The acoustic wave filter assembly includes a second filter port 1311. The second filter port 1311 may be configured to connect to, for example, a transceiver module of a wireless device, and may receive transmit signals from the transceiver module, and output receive signals to the transceiver module. The acoustic wave filter assembly includes a second antenna port 1312, configured to connect to an antenna, and transmit and receive signals via the antenna. The acoustic wave filter assembly 1300 includes a second acoustic wave filter 1314 connected between the second filter port 1311 and the second antenna port 1312. In the illustrated embodiment, the second acoustic wave filter 1314 is a band-pass filter configured to receive signals and output filtered signals to a cellular frequency pass band between approximately 3.3 GHZ and 4.2 GHz. The second acoustic wave filter 1314 comprises a plurality of BAW resonators 1316 connected in series and parallel between the second filter port 1311 and the second antenna port 1312. The acoustic wave filter assembly 1300 includes third and fourth ground pins 1313A, 1313B connected between the second antenna port 1312 and the second filter port 1311. The third and fourth ground pins 1313A, 1313B may be electrically connected to, or comprised in, the second acoustic wave filter 1314. The third and fourth ground pins 1313A, 1313B, are configured to be connected to ground. The acoustic wave filter assembly 1300 includes a metallic guard ring 1305 extending around the acoustic wave filter assembly 1300. The metallic guard ring 1305 is formed of an electrically conducting material, such as a material comprising gold, copper, and/or indium.

Figure 14:
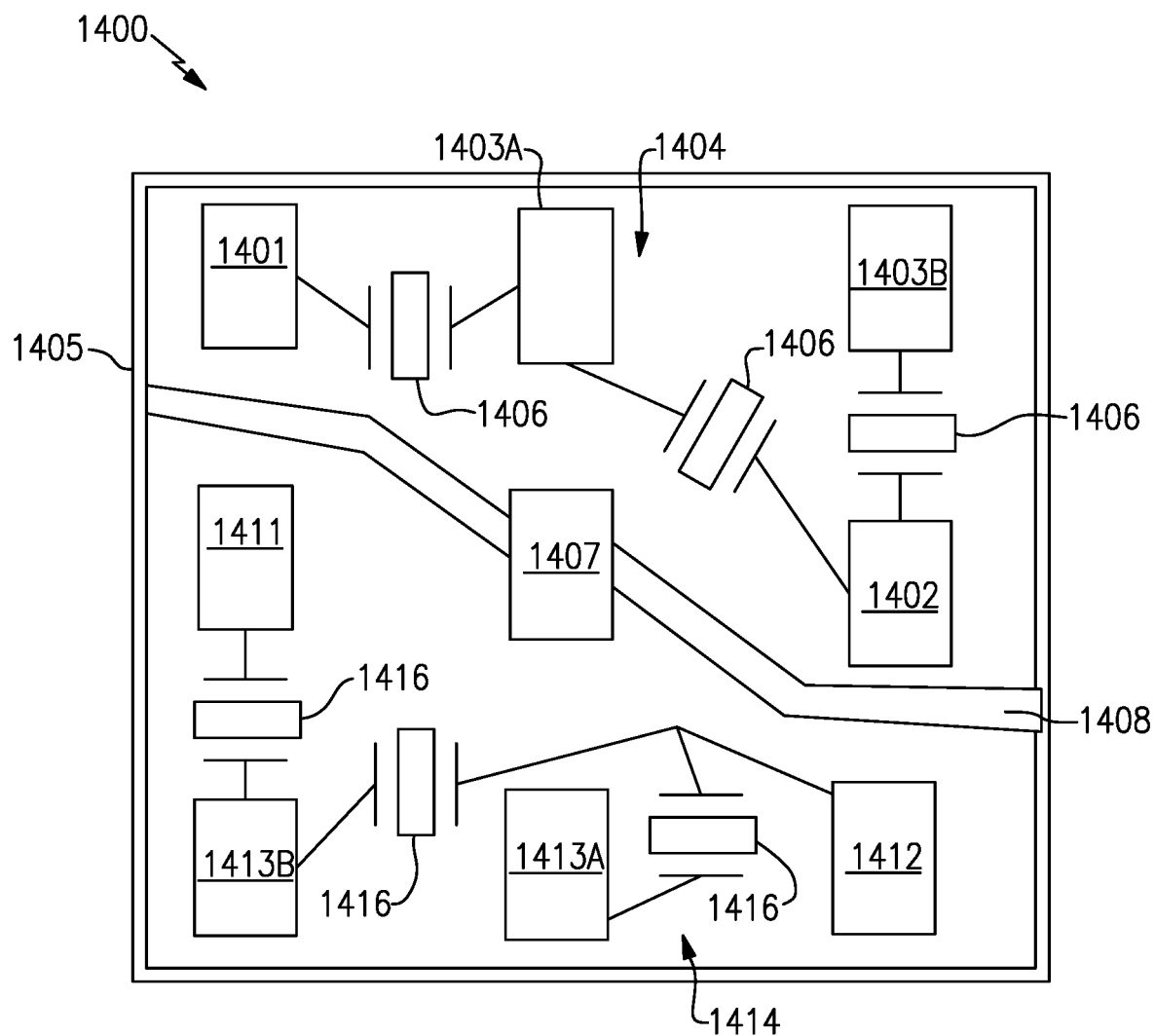
FIG. 14 is another example of an acoustic wave filter assembly according to aspects of the present disclosure.

FIG. 14 is a schematic showing the configuration of an acoustic wave filter assembly according to the present disclosure, indicated generally at 1400. The filter assembly 1400 may be arranged on a single semiconductor die. The acoustic wave filter assembly 1400 may be disposed on a substrate, for example, a silicon substrate that may include a dielectric surface layer of, for example, silicon dioxide. The acoustic wave filter assembly 1400 may comprise the substantially the same components as acoustic wave filter assembly 1300. The configuration of the components of acoustic wave filter assembly may also be substantially the same as acoustic wave filter assembly 1300. Acoustic wave filter assembly 1400 includes a ground pin 1407. The ground pin 1407 is configured to be electrically connected to ground. The ground pin 1407 is further electrically connected to the metallic guard ring 1405 via a conductive strip 1408. Accordingly, when the ground pin 1407 is electrically connected to ground, the metallic guard ring 1405 is grounded via the ground pin 1407. The ground pin 1407 and conductive strip 1408 are arranged such that the first filter port 1401, first antenna port 1402, first ground pins 1403A, 1403B, and first acoustic wave filter 1404 are on one side of the conductive strip 1408, and the second filter port 1411, second antenna port 1412, second ground pins 1413A, 1413B, and second acoustic wave filter 1414 are on the opposing side of the conductive strip 1408.

It has been found that the arrangement of the ground pin 1407 and conductive strip 1408, interposed between the two sides of filter assembly 1400 achieves improved isolation between the first and second antenna ports 1402, 1412, and first and second filter ports 1401, 1411, as will be shown in FIGS. 15-18 without a reduction in filter performance.

FIGS. 15-18 illustrate the frequency response curves, and frequency-isolation curves of the acoustic wave filter assemblies 1300, 1400. In each of FIGS. 15-18, the dashed line represents the known multiplexer 1300 having a floated guard ring. The solid line represents the multiplexer 1400 according to the present disclosure having a grounded metallic guard ring, conductive strip, and modified pin/port layout.

Figure 15:
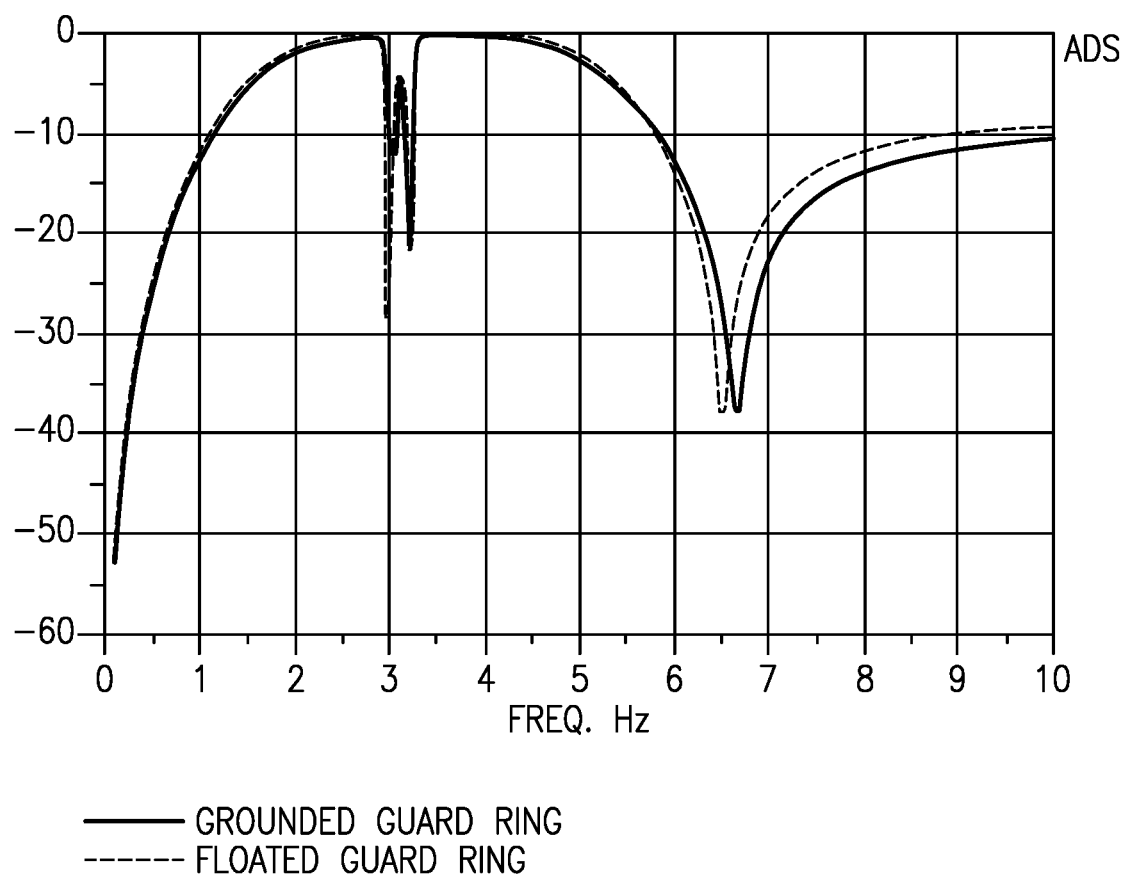
FIG. 15 is another frequency response graph of an acoustic wave filter assembly according to aspects of the present disclosure.
Figure 16:
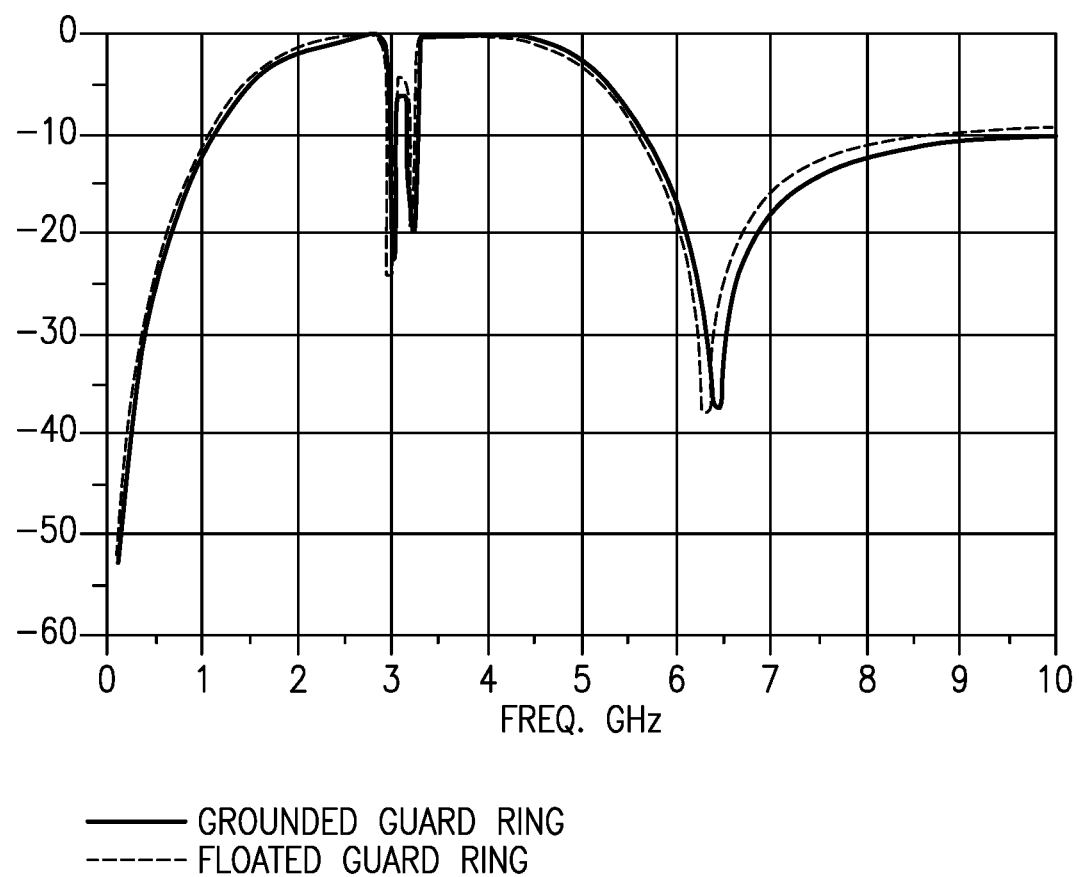
FIG. 16 is another frequency response graph of an acoustic wave filter assembly according to aspects of the present disclosure.

FIG. 15 shows the frequency response curves of the first acoustic wave filters 1304, 1404 of the acoustic wave filter assemblies 1300, 1400. FIG. 16 shows the frequency response curves of the second acoustic wave filter 1314, 1414, of the acoustic wave filter assemblies 1300, 1400. It can be seen that the frequency responses of both filter assemblies are substantially the same, and therefore the addition of the ground pin 1407 and conductive strip does not change the filter performance of the first and second acoustic wave filters 1404, 1414.

Figure 17:
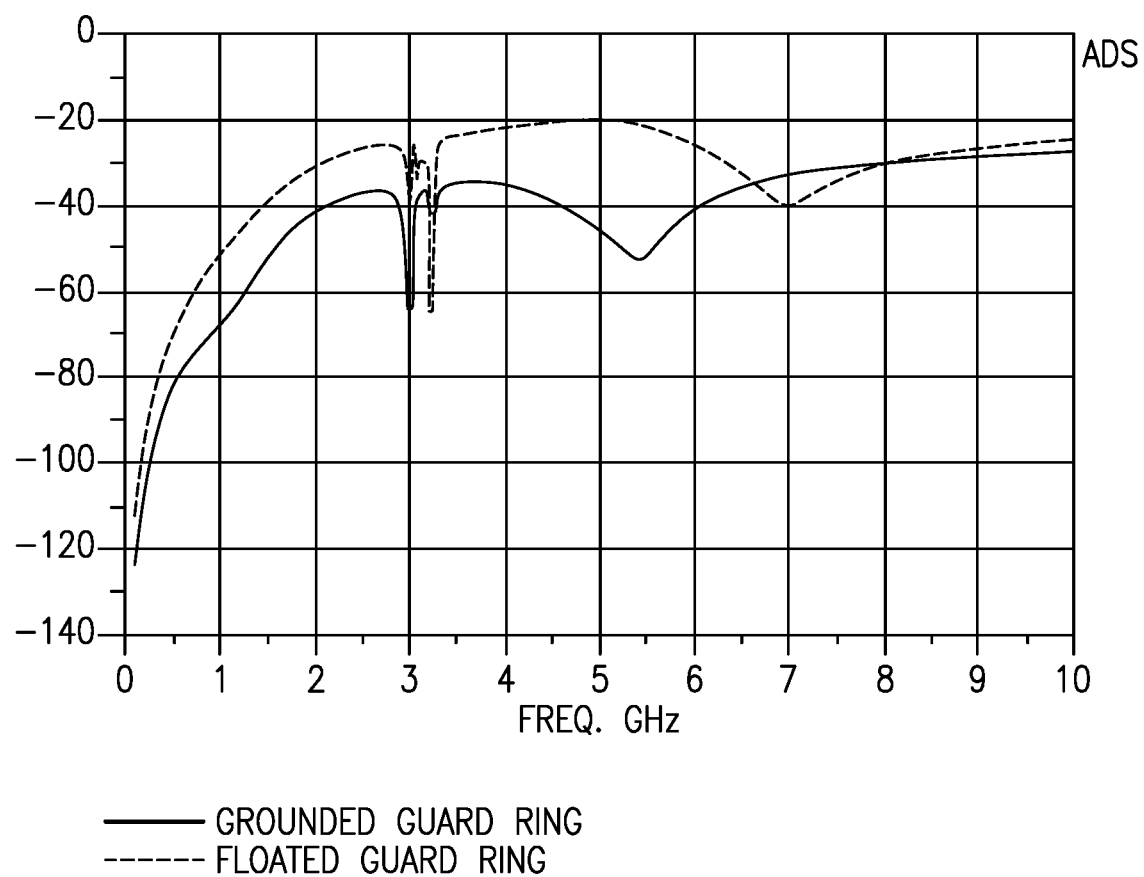
FIG. 17 is another frequency isolation graph of an acoustic wave filter assembly according to aspects of the present disclosure.
Figure 18:
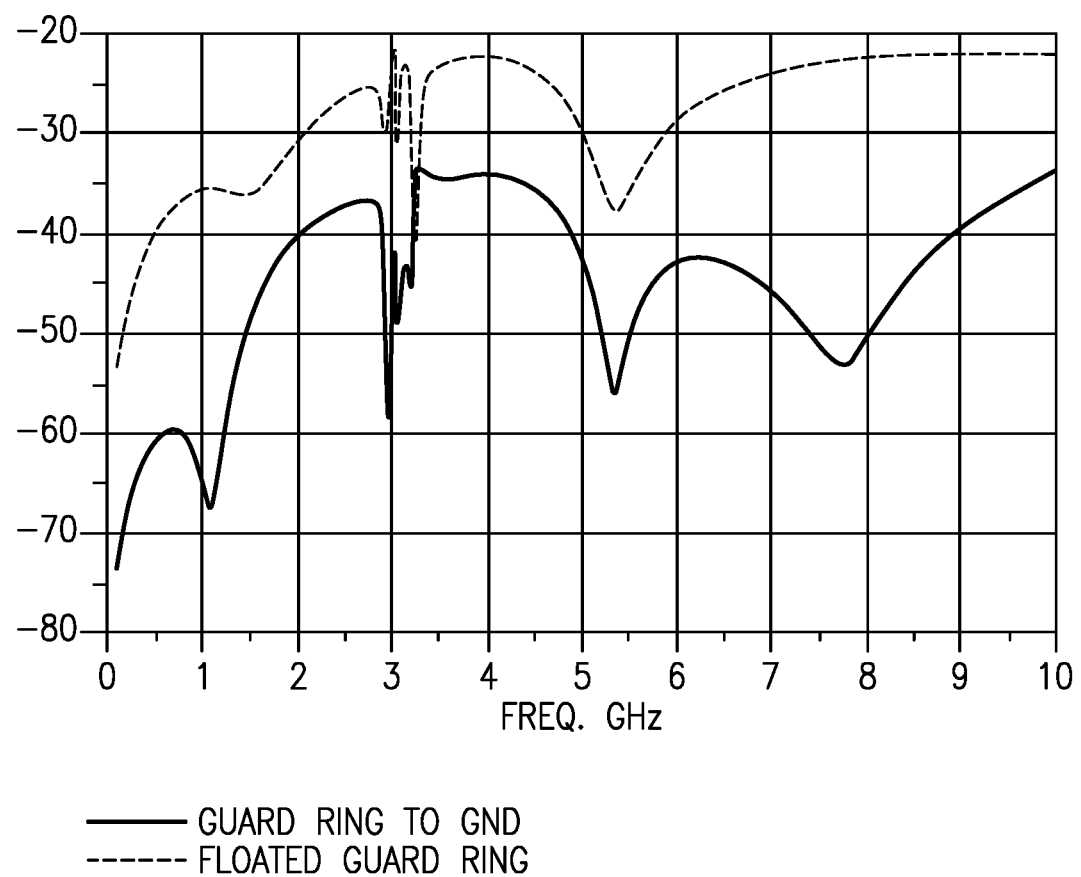
FIG. 18 is another frequency isolation graph of an acoustic wave filter assembly according to aspects of the present disclosure.

FIG. 17 shows the frequency-isolation curves representing the isolation between the first and second antenna ports 1302, 1312, 1402, 1412 of the two acoustic wave filter assemblies 1300, 1400. FIG. 18 shows the frequency-isolation curves representing the isolation between the first and second filter ports 1301, 1311, 1401, 1411 of the two acoustic wave filter assemblies 1300, 1400. It can be seen that both the filter port-filter port isolation, and antenna port-antenna port isolation of the acoustic wave filter assembly 1400 according to the invention are improved across substantially the entire frequency range from approximately 0 Hz to 10 GHZ compared to the acoustic wave filter assembly 1300.

The acoustic wave filter assemblies of FIGS. 2, 5, 9, 10, and 14, may also be included in a radio-frequency module, such as a radio-frequency front-end (RFFE) module. A schematic of an exemplary module is shown in FIG. 19.

Figure 19:
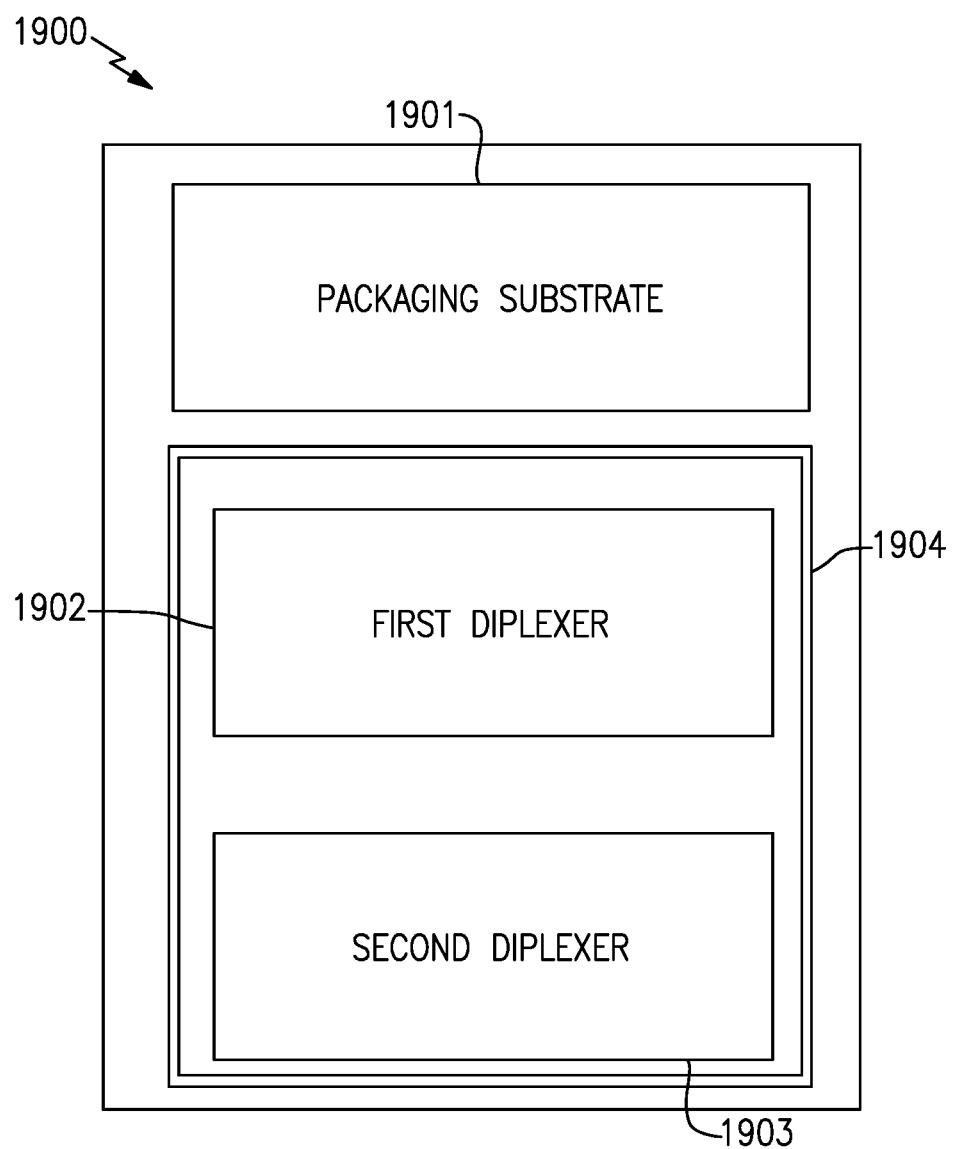
FIG. 19 is a schematic of a radio-frequency module according to aspects of the present disclosure.

FIG. 19 illustrates a radio-frequency module according to the present disclosure, indicated generally at 1900. The radio-frequency module 1900 may be, for example, a front-end module (FEM). The radio-frequency module 1900 may be connected between a transceiver module and an antenna of a wireless electronic device. The radio-frequency module includes a packaging substrate 1901. The packaging substrate 1901 is configured to receive a plurality of components. For example, the packaging substrate 1901 may be configured to receive a front-end power management integrated circuit (FE-PMIC) component, a power amplifier assembly, a match component, and one or more acoustic wave filter assemblies can be mounted and/or implemented on and/or within the packaging substrate 1901. The power amplifier assembly may include a plurality of power amplifiers and/or low-noise amplifiers. In the illustrated example, the radio-frequency module 1900 includes a first diplexer 1902 and a second diplexer 1903. The first diplexer 1902 and the second diplexer 1903 each include a plurality of acoustic wave filters and one or more ground pins. The first diplexer 1902 and the second diplexer 1903 are each configured to pass, in two directions, two different cellular frequency bands. The two frequency bands may comprise, for example, a first frequency band between approximately 3.3 GHZ and 4.2 GHZ, and a second frequency band between approximately 4.4 GHZ and 5 GHZ. The radio-frequency module 1900 includes a metallic guard ring 1904. In accordance with the present disclosure, at least one of the ground pins of each of the first and second diplexers 1902, 1903 is further electrically connected to the metallic guard ring 1904. In some embodiments, the radio-frequency module 1900 may include other components such as surface-mount technology (SMT) devices and an antenna switch module, which may be mounted on the packaging substrate 1901.

Figure 20:
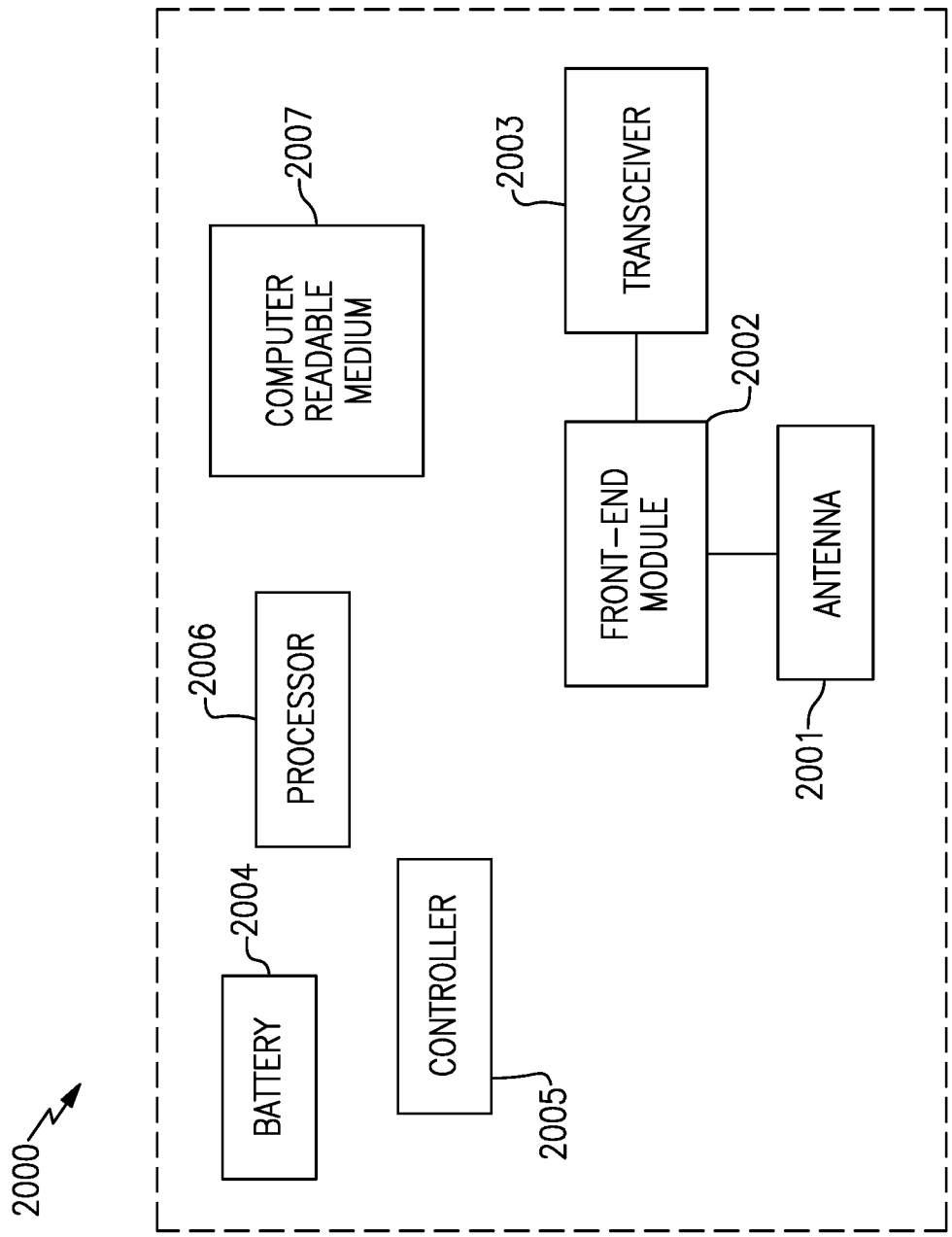
FIG. 20 is a schematic of a wireless electronic device according to aspects of the present disclosure.

FIG. 20 is a schematic diagram of a wireless device 2000 that can include aspects of the present invention. The wireless device can be, for example but not limited to, a portable telecommunication device such as, a mobile cellular-type telephone. The wireless device 2000 can include an antenna 2001. The antenna 2001 is configured to transmit and receive wireless radio-frequency signals. The antenna 2001 is connected to a front-end-module 2002. The front-end module 2002 can include one or more acoustic wave filter assemblies according to the present disclosure, including one or more metallic guard rings grounded via one or more ground pins of the acoustic wave filters comprised in the one or more acoustic wave filter assemblies. The front-end module 2002 is connected to a transceiver 2003. The transceiver 2003 is configured to generate radio-frequency signals for transmission and process incoming radio-frequency signals received from the antenna 2001. The wireless device 2000 includes a battery 2004 for supplying electrical power to the various components of the wireless device 2000. The wireless device 2000 includes a processor 2006, and a computer-readable medium 2007 to facilitate operation of the wireless device 2000. The computer-readable medium 2007 can be used for a wide variety of purposes, such as storing data and/or instructions to facilitate the operation of the wireless device 2000 and/or to provide storage of user information. The battery 2004 can be any suitable battery for use in a wireless device, including, for example, a lithium-ion battery. The wireless device 2000 can include one or more of a microphone arrangement, and may include a baseband system, a power management system, a user interface, and an audio codec. The wireless device 2000 may include multiple antennas. The antennas can include antennas for transmitting and/or receiving signals associated with a wide variety of frequencies and communications standards. The baseband system may be coupled to the user interface to facilitate processing of various user input and output, such as voice and data. The baseband system may provide the transceiver 2003 with digital representations of transmit signals, which the transceiver processes to generate radio-frequency signals for transmission. The baseband system may also process digital representations of received signals provided by the transceiver.

The teachings of the invention provided herein can be applied to other systems, not necessarily the systems described above. The elements and acts of the various embodiments described above can be combined to provide further embodiments.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected," as generally used herein, refer to two or more elements that may be either directly connected, or connected by way of one or more intermediate elements. Additionally, the words "herein," "above." "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A filter assembly, comprising:
a metallic guard ring extending around the filter assembly;
an antenna port surrounded by the metallic guard ring;
a filter port surrounded by the metallic guard ring;
an acoustic wave filter connected between the antenna port and the filter port, the acoustic wave filter including one or more bulk acoustic wave resonators; and
one or more ground pins connected between the filter port and the antenna port, at least one of the one or more ground pins being further connected to the metallic guard ring.

2. The filter assembly of claim 1 wherein the acoustic wave filter is configured to filter a transmit signal received at the filter port to a cellular frequency pass band and output the filtered transmit signal at the antenna port.

3. The filter assembly of claim 2 wherein the acoustic wave filter has a pass band one of between approximately 4.4 GHz and 5 GHz or between approximately 3.3 GHZ and 4.2 GHz.

4. The filter assembly of claim 1 wherein the acoustic wave filter is a band-pass filter.

5. The filter assembly of claim 1 wherein the acoustic wave filter is configured to filter a receive signal received at the antenna port to a cellular frequency pass band and output the filtered receive signal at the filter port.

6. A diplexer comprising:
a first acoustic wave filter connected between an antenna port and a first filter port, the first acoustic wave filter including one or more bulk acoustic wave resonators;
a second acoustic wave filter connected between the antenna port and a second filter port, the second acoustic wave filter including one or more bulk acoustic wave resonators;
a metallic guard ring extending around the first and second acoustic wave filters and about the antenna port, first filter port, and second filter port; and
one or more ground pins connected between the antenna port and the first and second filter ports, at least one of the one or more ground pins being further connected to the metallic guard ring.

7. The diplexer of claim 6 wherein the diplexer is arranged on a single semiconductor chip.

8. The diplexer of claim 6 wherein the first acoustic wave filter is configured to filter a transmit signal received at the first filter port to a first frequency pass band and output the filtered transmit signal to the antenna port.

9. The diplexer of claim 6 wherein the first acoustic wave filter is configured to filter a receive signal received at the antenna port to a first frequency pass band and output the filtered receive signal to the first filter port.

10. The diplexer of claim 6 wherein the second acoustic wave filter is configured to filter a transmit signal received at the second filter port to a second frequency pass band and output the filtered transmit signal to the antenna port.

11. The diplexer of claim 6 wherein the second acoustic wave filter is configured to filter a receive signal received at the antenna port to a second frequency pass band and output the filtered receive signal to the second filter port.

12. The diplexer of claim 6 wherein the first acoustic wave filter is a band-pass filter having a pass band one of between 4.4 GHz and 5 GHz or between 3.3 GHZ and 4.2 GHz.

13. A multiplexer formed on a semiconductor chip and comprising:
a first filter assembly including a first antenna port, one or more first filter ports, one or more first acoustic wave filters connected between the first antenna port and the one or more first filter ports, and one or more ground pins;
a second filter assembly including a second antenna port, one or more second filter ports, one or more second acoustic wave filters connected between the second antenna port and the one or more second filter ports, and one or more ground pins, at least one of the one or more second filter ports being located between the first antenna port and the second antenna port; and
a metallic guard ring extending around the first and second filter assemblies, at least one of the one or more ground pins of the first filter assembly being connected to the metallic guard ring, and at least one of the one or more ground pins of the second filter assembly being connected to the metallic guard ring.

14. The multiplexer of claim 13 further comprising a conductive strip extending across a surface of the semiconductor chip between the first filter assembly and the second filter assembly, the conductive strip being connected at a first end and a second end to the metallic guard ring.

15. The multiplexer of claim 14 wherein the conductive strip is further connected to a ground pin located between the first filter assembly and the second filter assembly.

16. The multiplexer of claim 13 wherein the first and second filter assemblies are diplexers.

17. The multiplexer of claim 13 wherein the multiplexer is formed on a single semiconductor chip.

18. A radio-frequency module, comprising:
a packaging substrate configured to receive a plurality of components;
a first diplexer including a first filter assembly including a first antenna port, one or more first filter ports, one or more first acoustic wave filters connected between the first antenna port and the one or more first filter ports, and one or more ground pins, and a second filter assembly including a second antenna port, one or more second filter ports, one or more second acoustic wave filters connected between the second antenna port and the one or more second filter ports, and one or more ground pins, at least one of the one or more second filter ports being located between the first antenna port and the second antenna port;

a second diplexer including a plurality of acoustic wave filters and one or more ground pins; and a metallic guard ring extending around the first and second diplexers, at least one of the one or more ground pins of the first diplexer being connected to the metallic guard ring, and at least one of the one or more ground pins of the second diplexer being connected to the metallic guard ring.

19. The radio-frequency module of claim 18 wherein the radio-frequency module is a front-end module.

20. A wireless device, comprising:

a transceiver configured to generate a radio-frequency signal;

a front-end module in communication with the transceiver, the front-end module including a packaging substrate configured to receive a plurality of components, the front-end module further including a first diplexer a first filter assembly including a first antenna port, one or more first filter ports, one or more first acoustic wave filters connected between the first antenna port and the one or more first filter ports, and one or more ground pins, and a second filter assembly including a second antenna port, one or more second filter ports, one or more second acoustic wave filters connected between the second antenna port and the one or more second filter ports, and one or more ground pins, at least one of the one or more second filter ports being located between the first antenna port and the second antenna port, a second diplexer having a plurality of acoustic wave filters and one or more ground pins, and a metallic guard ring extending around the first and second diplexers, at least one of the one or more ground pins of the first diplexer being connected to the metallic guard ring, and at least one of the one or more ground pins of the second diplexer being connected to the metallic guard ring; and an antenna in communication with the front-end module.

\* \* \* \* \*